United States Patent
Tsai et al.

(10) Patent No.: US 10,052,623 B2
(45) Date of Patent: Aug. 21, 2018

(54) INORGANIC MATERIAL FOR REMOVING HARMFUL SUBSTANCE FROM WASTEWATER AND METHOD OF PREPARING THE SAME, AND METHOD FOR WASTEWATER TREATMENT

(71) Applicant: Industrial Technology Research Institute, Hsinchu (TW)

(72) Inventors: Cheng-Kuo Tsai, Hsinchu (TW); Huan-Yi Hung, Hsinchu (TW); Pang-Hung Liu, Hsinchu (TW); Hsien-Hui Tai, Hsinchu (TW); Gaw-Hao Huang, Hsinchu (TW); Shu-Fang Hsu, Hsinchu (TW); Ren-Yang Horng, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 57 days.

(21) Appl. No.: 15/195,216

(22) Filed: Jun. 28, 2016

(65) Prior Publication Data
US 2016/0375433 A1    Dec. 29, 2016

(30) Foreign Application Priority Data

Jun. 29, 2015 (TW) ............................ 104120915 A
Jun. 2, 2016 (TW) ............................ 105117338 A

(51) Int. Cl.
*B01J 39/14* (2006.01)
*C03C 3/091* (2006.01)
(Continued)

(52) U.S. Cl.
CPC ............. *B01J 39/14* (2013.01); *B01J 39/02* (2013.01); *C02F 1/281* (2013.01); *C02F 1/288* (2013.01);
(Continued)

(58) Field of Classification Search
CPC . B01J 39/02; B01J 39/14; C02F 1/281; C02F 1/288; C02F 2001/5218;
(Continued)

(56) References Cited

U.S. PATENT DOCUMENTS

| 4,687,581 A | 8/1987 | Macedo et al. |
| 4,824,808 A | 4/1989 | Dumbaugh, Jr. |

(Continued)

FOREIGN PATENT DOCUMENTS

| CN | 1043096 A | 6/1990 |
| CN | 1237946 A | 12/1999 |

(Continued)

OTHER PUBLICATIONS

Duffus, John, H. "'Heavy metals'—A Meaningless Term?," Pure Applied Chemistry, vol. 74, No. 5 (2002), pp. 793-807.
(Continued)

*Primary Examiner* — Dirk R Bass
(74) *Attorney, Agent, or Firm* — Mintz Levin Cohn Ferris Glovsky and Popeo, P.C.; Peter F. Corless

(57) ABSTRACT

An inorganic material for removing a harmful substance from wastewater is provided. The inorganic material includes a plurality of porous silicate particles having a glass phase structure, wherein the plurality of porous silicate particles include silicon dioxide, aluminum oxide, barium oxide, cesium oxide, and boron oxide, and have a zeta potential of a negative value at pH of from 1 to 5, and wherein the average pore diameter of the porous silicate particles is in a range of from 3 to 50 nm. Moreover, a method for preparing an inorganic material for removing a harmful substance from wastewater and a method for wastewater treatment are further provided.

18 Claims, 16 Drawing Sheets

(51) Int. Cl.

| | | |
|---|---|---|
| *C02F 1/42* | (2006.01) | |
| *C02F 1/52* | (2006.01) | |
| *C02F 1/28* | (2006.01) | |
| *B01J 39/02* | (2006.01) | |
| *C03C 4/18* | (2006.01) | |
| *C02F 101/10* | (2006.01) | |
| *C02F 101/20* | (2006.01) | |
| *C02F 101/22* | (2006.01) | |
| *C02F 103/34* | (2006.01) | |
| *C02F 101/14* | (2006.01) | |

(52) U.S. Cl.
CPC ............... *C03C 3/091* (2013.01); *C03C 4/18* (2013.01); *C02F 2001/5218* (2013.01); *C02F 2101/103* (2013.01); *C02F 2101/108* (2013.01); *C02F 2101/14* (2013.01); *C02F 2101/20* (2013.01); *C02F 2101/22* (2013.01); *C02F 2103/346* (2013.01); *C02F 2209/001* (2013.01); *C02F 2209/02* (2013.01); *C02F 2209/44* (2013.01); *C03C 2204/00* (2013.01)

(58) Field of Classification Search
CPC .......... C02F 2101/103; C02F 2101/108; C02F 2101/14; C02F 2101/20; C02F 2101/22; C02F 2103/346; C02F 2209/001; C02F 2209/02; C02F 2209/44; C03C 2204/00; C03C 3/00

See application file for complete search history.

(56) References Cited

U.S. PATENT DOCUMENTS

| | | |
|---|---|---|
| 2013/0273320 A1 | 10/2013 | Bockmeyer et al. |
| 2014/0151303 A1 | 6/2014 | Bagatin et al. |

FOREIGN PATENT DOCUMENTS

| | | |
|---|---|---|
| CN | 1204954 C | 6/2005 |
| CN | 100369842 C | 2/2008 |
| CN | 101406777 A | 4/2009 |
| CN | 101790412 A | 7/2010 |
| CN | 101955374 A | 1/2011 |
| CN | 102125786 A | 7/2011 |
| CN | 102512221 A | 6/2012 |
| CN | 102515551 A | 6/2012 |
| CN | 102659221 A | 9/2012 |
| CN | 103205414 A | 7/2013 |
| CN | 103351165 A | 10/2013 |
| CN | 104039703 A | 9/2014 |
| JP | 2000117291 A | 4/2000 |
| JP | 2009248006 A | 10/2009 |
| JP | 2010-214233 A | 9/2010 |
| JP | 2011026141 A | 2/2011 |
| JP | 2013112533 A | 6/2013 |
| JP | 05439621 B1 | 3/2014 |
| KR | 0149973 B1 | 10/1996 |
| KR | 10-1075069 B1 | 10/2011 |
| WO | 2014/146481 A1 | 9/2014 |

OTHER PUBLICATIONS

Aguado, et al., "Aqueous heavy metals removal by adsorption on amine-functionalized mesoporous silica," Journal of Hazardous Materials, 163 (2009) pp. 213-221.

Heidari, Aghdas, et al., "Removal of Ni(ii), Cd(II), and Pb(II) from a ternary aqueous solution by amino functionalized mesoporous and nano mesoporous silica", Chemical Engineering Journal 153 (2009) pp. 70-79.

Hui, K.S. et al., "Removal of mixed heavy metal ions in wastewater by zeolite 4A and residual products from recycled coal fly ash", Journal of Hazardous Materials B127 (2005) pp. 89-101.

Machida, Motoi et al., "Cadmium(II) adsorption using functional mesoporous silica and activated carbon", Journal of Hazardous Materials 221-222 (2012), pp. 220-227.

Nah, In Wook et al., "Removal of Pb ion from water by magnetically modified zeolite", Minerals Engineering 19 (2006), pp. 1452-1455.

Giraldo, Liliana and Moreno-Pirajan, Juan Carlos, "Study on the Adsorption of Heavy Metal Ions from Aqueous Solution on Modified SBA-15", Materials Research 16(4) (2013), pp. 745-754.

R. Nakazawa et al., "Improvement and characterization of phosphate-adsorption capacity of porous glass materials," Bulletin of Tokyo Metropolitan Industrial Technology Research Institute, No. 4 (2009), pp. 2-7.

M. Tsujiguchi et al., "Synthesis of Zeolite from Glass," Journal of the Society of Materials Science, vol. 62, 2013, pp. 357-361.

H. Kadoki et al., "Characteristics of the Foamed Glass Reproduction From Waste Liquid Crystal Panel Glass," Research of National Urban Cleaning, Paper Collection of Case Study Presentation Lecture (Dec. 2009), pp. 138-140.

Office Action issued in corresponding Chinese Application No. 100089 dated Apr. 28, 2018.

X.C. Yang et al., "New Architecutural Glass", China Electric Power Press (2008)—partial English translation.

icate glass melt ($RO$—$Al_2O_3$—$SiO_2$, wherein RO represents an alkaline earth metal compound, such as BaO, CaO, MgO and SrO). The material is composed of a single component, inert to a chemical reaction, and thermotolerant. Further, the material has characteristics like a high glass transition temperature, a high melting temperature, and a high level of hardness. As such, unlike common soda-lime glass, waste LCD panel glass cannot be processed for further use by a fabrication equipment. Currently, most of the waste LCD panel glass is landfilled. However, the recycle of the waste LCD panel glass has become an important issue of environmental protection.

INORGANIC MATERIAL FOR REMOVING HARMFUL SUBSTANCE FROM WASTEWATER AND METHOD OF PREPARING THE SAME, AND METHOD FOR WASTEWATER TREATMENT

CROSS-REFERENCE TO RELATED APPLICATION

The present application is based on, and claims priority from Taiwanese Patent Application Number 104120915, filed on Jun. 29, 2015, and Taiwanese Patent Application Number 105117338, filed on Jun. 2, 2016, the disclosure of which is hereby incorporated by reference herein in its entirety.

TECHNICAL FIELD

The present disclosure relates to an inorganic material, prepared by using waste glass as a raw material, for removing a harmful substance from wastewater and a method for preparing the same, and a method for wastewater treatment.

BACKGROUND

As the demand for consumer electronic products increases, LCD manufacturing plants continuously expand throughput to satisfy the market demand. However, as the service lives of products are about to expire, more and more waste LCDs are generated. Currently, the number of waste LCDs in Taiwan has reached thousands of tons/year, and the number is expected to increase by year. The glass component of an LCD panel is alkaline metal oxide-free aluminosilicate glass melt ($RO$—$Al_2O_3$—$SiO_2$, wherein RO represents an alkaline earth metal compound, such as BaO, CaO, MgO and SrO). The material is composed of a single component, inert to a chemical reaction, and thermotolerant. Further, the material has characteristics like a high glass transition temperature, a high melting temperature, and a high level of hardness. As such, unlike common soda-lime glass, waste LCD panel glass cannot be processed for further use by a fabrication equipment. Currently, most of the waste LCD panel glass is landfilled. However, the recycle of the waste LCD panel glass has become an important issue of environmental protection.

As the throughput expands, a large amount of industrial wastewater, e.g., arsenic commonly used in semiconductor fabrication and heavy metal components (e.g., lead, copper, chromium, cadmium, nickel and zinc) commonly found in wastewater from an electroplating plant is produced in each industrial process. The industrial wastewater is mainly subjected to conventional chemical precipitation. The wastewater treatment is not only high in cost, but fails to appropriately treat chemical sludge. As such, secondary contamination may even occur. Another common approach is to use zeolite for a wastewater treatment. However, zeolite cannot be directly applied in the treatment of strongly acidic wastewater, because it disintegrates or loses adsorbability in a strong acid.

Accordingly, it is an urgent issue to develop a more convenient and efficient treatment method for resolving the contamination of a heavy metal in water. The objective of the present disclosure is how to resolve the issue of a large amount of waste LCD panel glass to reduce environmental burden, while providing a more beneficial way of reusing the waste LCD panel glass to create a sustainable value for the material.

SUMMARY

In the conception of the present disclosure, the composition and chemical structure of LCD panel glass is reconfigured by using a modifier, based on the physical and chemical properties of the LCD panel glass, so as to retain its stability in an acidic or basic environment, while altering its surface properties to increase chemical activity and physical adsorptivity. As a result, the waste LCD panel glass can be used as a raw material to prepare a highly adsorbable and recyclable inorganic material (abbreviated hereinafter as "inorganic material") for removing a harmful substance from wastewater.

Based on the above conception, the present disclosure provides an inorganic material including a plurality of porous silicate particles having a glass phase structure. The component of the porous silicate particles comprises silicon dioxide, aluminum oxide, barium oxide, cesium oxide and boron oxide, wherein the porous silicate particles have an average pore diameter of from 3 to 50 nm.

The present disclosure further provides a method for preparing an inorganic material, including: preparing silicate powder and a metal compound, wherein the component of the silicate powder comprises silicon dioxide, aluminum oxide, barium oxide, cesium oxide and boron oxide; and reacting the silicate powder with the metal compound at a reaction temperature of from 800 to 1500° C. to form a plurality of porous silicate particles having a glass phase structure, wherein the component of the porous silicate particles comprises silicon dioxide, aluminum oxide, barium oxide, cesium oxide and boron oxide, wherein the porous silicate particles have an average pore diameter of from 3 to 50 nm, the porous silicate particles have a zeta potential of a negative value at pH of from 1 to 5, and the silicate powder and the metal compound are at a weight ratio of from 1:1 to 1:20.

In the present disclosure, the composition and the molecular structure of the waste LCD panel glass is reconfigured by the metal compound to obtain an inorganic material having a plurality of porous silicate particles having a glass phase structure. Since the average pore diameter of the porous silicate particles is in a range of from 3 to 50 nm, a nano-scale pore can effectively adsorb a heavy metal ion. Moreover, in an acidic environment, the zeta potential of the porous silicate particles can still be a negative value, indicating that the porous silicate particles can adsorb positively-charged heavy metal ions in an acidic solution. Therefore, the porous silicate particles of the present disclosure can be used as an inorganic material to treat the harmful substances in strongly acidic wastewater. The treated wastewater can meet an effluent standard, and the inorganic material with the adsorbed harmful substances can be recycled for reuse.

The present disclosure further provides a method for wastewater treatment, including steps of: feeding wastewater containing a harmful substance into a fluidized bed reactor containing a support for the harmful substance in the wastewater to be crystallized on the support to produce treated wastewater; and feeding the treated wastewater out from the fluidized bed reactor, wherein the support includes the inorganic material of the present disclosure. The harmful substance in the wastewater includes a metal ion (e.g., copper, nickel, cadmium, chromium, zinc or copper) or a non-metal ion (e.g., arsenic, boron, phosphor or fluorine).

BRIEF DESCRIPTIONS OF THE DRAWINGS

Figure 1A:
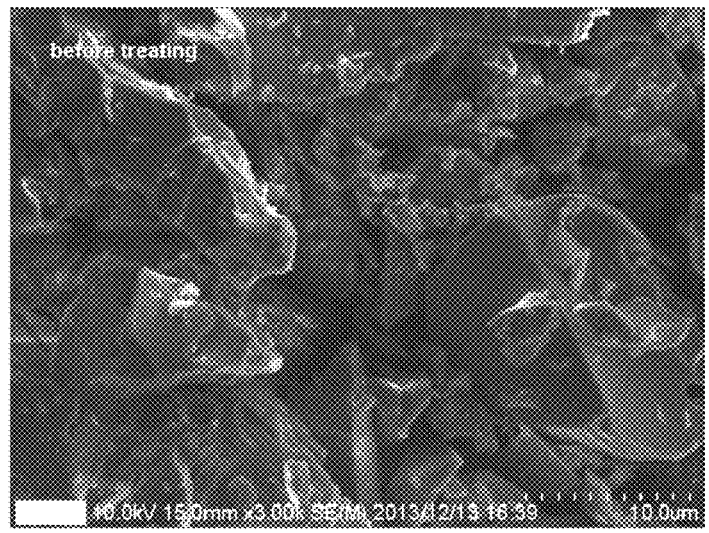
FIG. 1A is a scanning electronic microscopic (SEM) image of waste LCD panel glass powder.

FIGS. 11A to 11D are SEM sectional images of the conventional silica sand support before a reaction and after 1 day, 3 days and 5 days of reaction, respectively; and FIGS. 12A to 12D are SEM sectional images of the MCL material support before a reaction and after 1 day, 3 days and 5 days of reaction, respectively.

DETAILED DESCRIPTIONS

Unless specified in the context, the singular forms, "a", "an" and "the", used in the specification and the appended claims include the plural forms.

In the present disclosure, the term "glass phase" refers to an amorphous semi-solid state. Further, since the structure of silicate with a glass phase structure is very complicated, the composition of silicate is expressed as an oxide of each metal, rather than a salt form. The term "heavy metal" includes transitional metals and metalloid element arsenic having biotoxicity.

In the present disclosure, waste LCD panel glass is used as a raw material for preparing an inorganic material. The method for preparing the inorganic material includes the following steps. Firstly, silicate powder produced by using waste LCD panel glass as a raw material and a metal compound are prepared, wherein the silicate powder includes silicon dioxide, aluminum oxide, barium oxide, cesium oxide and boron oxide. Secondly, the silicate powder reacted with the metal compound at a reaction temperature of from 800 to 1500° C., so as to form a plurality of porous silicate particles having a glass phase, wherein the porous silicate particles each has a pore diameter of from 1 to 100 nm, and the porous silicate particles have an average pore diameter of from 3 to 50 nm.

Specifically, the silicate powder can be prepared by pulverizing the waste LCD panel glass. The particle diameter of the silicate powder is not particularly limited, and it can be, for example, from micrometers to millimeters. The components of the silicate powder include silicon dioxide, aluminum oxide, boron oxide, barium oxide and cesium oxide, wherein the amount of barium oxide is higher than 5%, based on the weight of the silicate powder.

In some embodiments, the waste LCD panel glass and common soda-lime glass can be used to prepare the silicate powder. Therefore, the components of the silicate powder can further include sodium oxide, magnesium oxide, and calcium oxide.

In the present disclosure, a metal compound that is more active, e.g., an alkaline metal compound of group IIIA or an alkaline earth metal compound of group IIA, is mixed and melted with the silicate powder at a reaction temperature of from 800 to 1500° C. for a reaction to take place. Group IIIA metal ions, such as boron, can be removed by group IA or IIA metal ions, which are more active. Accordingly, the structure of the original silicon skeleton of silicate can be modified to create active sites for adsorbing highly reactive metal ions (e.g., group IA or IIA metal ions), and the highly reactive metal ions can have a replacement reaction with heavy metal ions in an acidic environment. Further, a large amount of nano-scale pores can be formed in the structure of silicate, and the nano-scale pores can adsorb more heavy metal ions than micro-scale pores.

In some embodiments, the metal compound is selected from potassium carbonate, sodium carbonate or a combination of the above compounds. In other embodiments, the metal compound can further include at least one of calcium carbonate and magnesium carbonate. The metal compound is mixed and melted with the silicate powder at a weight less than that of the silicate powder. Specifically, the silicate powder and the metal compound are at a weight ratio of from, for example, 1:1 to 1:20, or for example, 1:1 to 1:10.

The temperature for reacting the silicate powder and the metal compound is from, for example, 800 to 1500° C., or for example, 900 to 1300° C. The reaction time is no longer than 1 hour, for example, 5 to 30 minutes. After the reaction is completed, the silicate melt is cooled to room temperature, by an approach like natural cooling or rapid cooling, so as to form a plurality of porous silicate particles having a glass phase structure.

Because the metal compound may be present in an excessive amount, an acidic solution (e.g., a mixed solution of nitric acid, hydrochloric acid and citric acid at concentrations of from 0.1 to 1M) can be used to dissolve residues of the metal compound and impurities. Then, solid-liquid separation is performed to obtain a solid. Afterwards, the solid is baked to dry at a temperature higher than 110° C., and thereby obtaining the porous silicate particles having a glass phase structure.

The inorganic material of the present disclosure includes a plurality of porous silicate particles having a glass phase structure. The components of the porous silicate particles include silicon dioxide, aluminum oxide, barium oxide, cesium oxide and boron oxide, wherein the amount of boron oxide is not higher than 5%, based on the weight of the porous silicate particles.

Specifically, the particle diameter of each of the porous silicate particles is not particularly limited, and it can be, for example, from micrometers to nanometers. In some examples, each of the porous silicate particles has a particle diameter of from 0.1 to 0.4 mm, for example, 0.2 to 0.3 mm.

Moreover, the pore diameters, specific surface areas and specific density of the porous silicate particles are not particularly limited. The average pore diameter of the porous silicate particles is from 3 to 50 nm, for example, from 8 to 25 nm. The specific surface area of the porous silicate particles is from 65 to 500 $m^2/g$, and the specific density of the porous silicate particles is from 0.5 to 0.8 $g/cm^3$, for example, 0.61 $g/cm^3$.

In some embodiments, the inorganic material can further include an active metal, which is adsorbed at the active sites in the surface structures of the porous silicate particles. The active metal includes at least one of sodium, potassium, calcium, and magnesium. The amount of the active metal is from 3 to 21%, based on the weight of the inorganic material (i.e., the weight of the porous silicate particles and the active metal).

Because the porous silicate particles of the inorganic material of the present disclosure have a large amount of asymmetrical charges, ion exchange sites (i.e., active sites), and pores with large specific surface areas at the same time, the heavy metals in wastewater can be chemically and physically adsorbed.

The inorganic material of the present disclosure can be applied to the adsorption of a heavy metal from wastewater. As such, the inorganic material can be in an adsorbed state with an adsorbed heavy metal, a desorbed state removing an adsorbed heavy metal, or a regenerated state with a regenerated, highly active metal. Specifically, in an adsorbed state, the inorganic material can further include a heavy metal adsorbed onto the porous silicate particles, and the heavy metal includes at least one of a transitional metal and arsenic. The weight of heavy metal adsorbed onto each gram of the inorganic material can be higher than 10 mg.

The method for wastewater treatment of the present disclosure includes a step of providing wastewater containing a heavy metal, wherein the pH of the wastewater is not greater than 5; and the heavy metal in the wastewater is adsorbed onto the plurality of porous silicate particles having a glass phase structure, wherein the porous silicate particles contain silicon oxide, aluminum oxide, barium oxide, cesium oxide and boron oxide, the pore diameter of each of the porous silicate particles is from 1 to 100 nm, and the average pore diameter of the porous silicate is from 3 to 50 nm.

In the inorganic material of the present disclosure, the porous silicate particles can be recycled for reuse by desorption and regeneration. Accordingly, after the heavy metal is adsorbed onto the porous silicate particles, the method for wastewater treatment of the present disclosure can further include the following steps. The heavy metal adsorbed onto the porous silicate particles is desorbed by an acidic solution. Then, the porous silicate particles without the adsorbed heavy metal are regenerated by a basic solution. Afterwards, the regenerated porous silicate particles are subjected to an adsorption treatment, for example, re-adsorbing the heavy metal from the wastewater.

Specifically, the desorption of the porous silicate particles with the adsorbed heavy metal can be achieved by using 4 to 5 wt % of a nitric acid solution to react at room temperature for 5 to 20 minutes, so as for $H^+$ in the acidic solution to replace the heavy metal adsorbed onto the porous silicate particles. The regeneration of the desorbed porous silicate particles can be achieved by using a sodium hydroxide solution or a potassium hydroxide solution at a pH of from 6 to 10.5, so as for the sodium or potassium ions in the solution to replace $H^+$ at the active sites of the porous silicate particles for the active sites to become an active metal with high reactivity again.

The inorganic material of the present disclosure can also be applied to fluidized bed crystallization (FBC) as a support for a fluidized bed reactor, so as for a harmful substance (such as arsenic, boron, phosphor or fluorine) to form a crystal on the support, and thereby removing the harmful substance from wastewater.

The method for wastewater treatment of the present disclosure also includes a step of feeding wastewater into a fluidized bed reactor containing a support, so as for the harmful substance in the wastewater to crystallize on the support for removal, wherein the support includes the inorganic material of the present disclosure.

Figure 7:
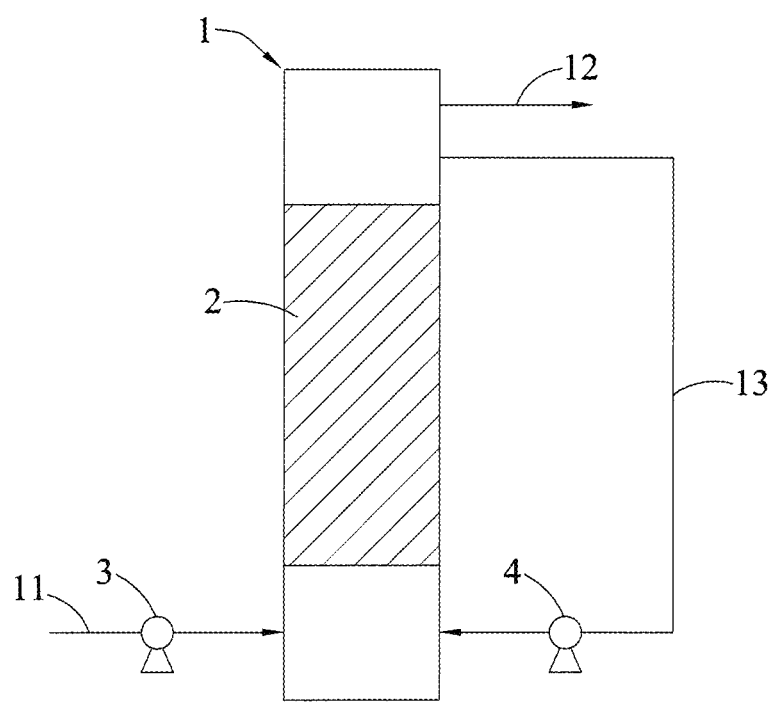
FIG. 7 is a schematic diagram of a method for wastewater treatment by using a fluidized bed reactor of the present disclosure.

After wastewater is treated by the method for wastewater treatment of the present disclosure, the inorganic material of the present disclosure further includes the crystal of the harmful substance crystallized on the porous silicate particles. Specifically, the harmful substance can crystallize on the surfaces or within the pores of the porous silicate particles. In some embodiments, the crystal of the harmful substance is at least one of an arsenic crystal, a boron crystal, a phosphor crystal, and a fluorine crystal. As shown in FIG. 7, the method for wastewater treatment includes using a pump 3 to feed wastewater into a fluidized bed reactor 1 containing a support 2 via a pipeline 11, so as for the harmful substance in the wastewater to crystallize on the support 2, and thereby removing the harmful substance to produce treated wastewater, which is then fed out via the pipeline 12, wherein the support 2 includes the inorganic material of the present disclosure. Moreover, a part of the treated wastewater in the fluidized bed reactor 1 is refluxed into the untreated wastewater in the fluidized bed reactor 1 via a refluxing pipeline 13, so as to cause fluidization for the fluidized bed reactor 1 to be sufficiently reacted and stably balanced, wherein the fluidization is generated by using the pump 4 to control the rotational speed and flow amount by using electricity as the source of the required force.

In some embodiments, when the inorganic material of the present disclosure is used as a support in a fluidized bed reactor for treating wastewater, the average pore diameter of the porous silicate particles contained in the inorganic material is from 3 to 50 nm, the specific density of the porous silicate particles is from 0.5 to 0.7 $g/cm^3$, the particle diameter of each of the porous silicate particles is from 0.1 mm to 0.4 mm, and the pH of the wastewater is controlled in the range of from 8.5 to 11.5.

The following specific examples illustrate the detailed description of the present disclosure, so as to enable a person having ordinary skill in the art to conceive the other advantages and effects of the present disclosure from the disclosure of the present specification. The present disclosure can also be implemented or applied based on the other different examples. Each of the details in the present specification can also be modified or altered based on different aspects and applications, without departing from the spirit of the present disclosure.

Examples 1 to 11 Preparation of Inorganic Materials

After waste LCD panel glass powder was dissolved in hydrofluoric acid (HF), an inductively coupled plasmaatomic emission spectroscopic (ICP/AES) analysis was performed on the composition and component ratios of the glass. The analytical results are listed in Table 1.

TABLE 1

| Component | Silicon dioxide (SiO$_2$) | Aluminum oxide (Al$_2$O$_3$) | Boron oxide (B$_2$O$_3$) | Calcium oxide (CaO) | Magnesium oxide (MgO) | Cesium oxide (SrO) | Polyvalent element |
|---|---|---|---|---|---|---|---|
| Weight % | 58.9 | 17.8 | 8.5 | 3.05 | 3.2 | 8.38 | 0.17 |

Silicate powder was prepared by using the waste LCD panel glass. Different weight ratios were used to mix the silicate powder with a metal compound, and different temperatures were used for the silicate powder to form porous silicate particles by reacting with the metal compound, and thereby obtaining inorganic materials of the present disclosure. The compositions of the raw materials and the reaction temperatures in examples 1 to 11 are listed in Table 2.

TABLE 2

| Inorganic material | Waste LCD panel glass powder (g) | Group IA Compound | Group IIA Compound | Reaction temperature (° C.) |
|---|---|---|---|---|
| Example 1 | 200 | 200 g sodium carbonate | 20 g calcium carbonate | 1500 |
| Example 2 | 200 | 400 g sodium carbonate | 20 g calcium carbonate | 1500 |
| Example 3 | 200 | 600 g sodium carbonate | 0 | 1300 |
| Example 4 | 200 | 800 g sodium carbonate | 0 | 1300 |
| Example 5 | 200 | 500 g sodium carbonate plus 500 g potassium carbonate | 0 | 1300 |
| Example 6 | 150 | 1200 g potassium carbonate | 0 | 900 |
| Example 7 | 100 | 600 g sodium carbonate plus 400 g potassium carbonate | 0 | 900 |
| Example 8 | 100 | 1500 g sodium carbonate plus 500 g potassium carbonate | 0 | 800 |
| Example 9 | 200 | 200 g sodium carbonate | 10 g calcium carbonate | 1500 |
| Example 10 | 200 | 400 g sodium carbonate | 10 g calcium carbonate | 1500 |
| Example 11 | 200 | 600 g sodium carbonate | 10 g calcium carbonate | 1300 |

SEM, TEM, and XRD were used to analyze the LCD panel glass powder and the inorganic materials in the examples.

Figure 1B:
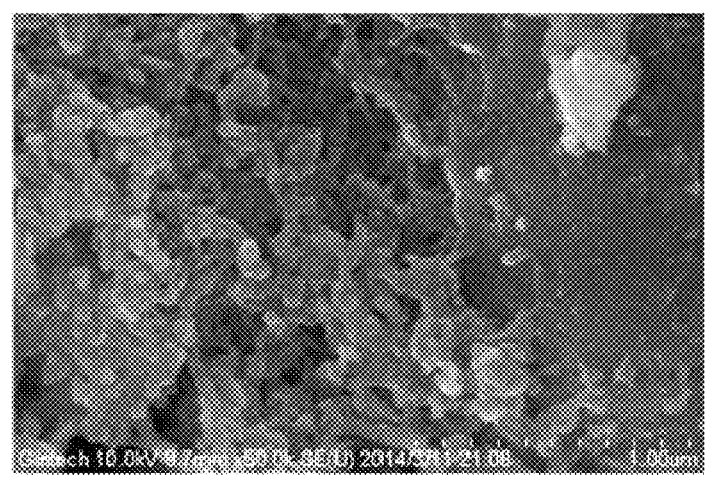
FIG. 1B is an SEM image of an inorganic material of the present disclosure.
Figure 2:
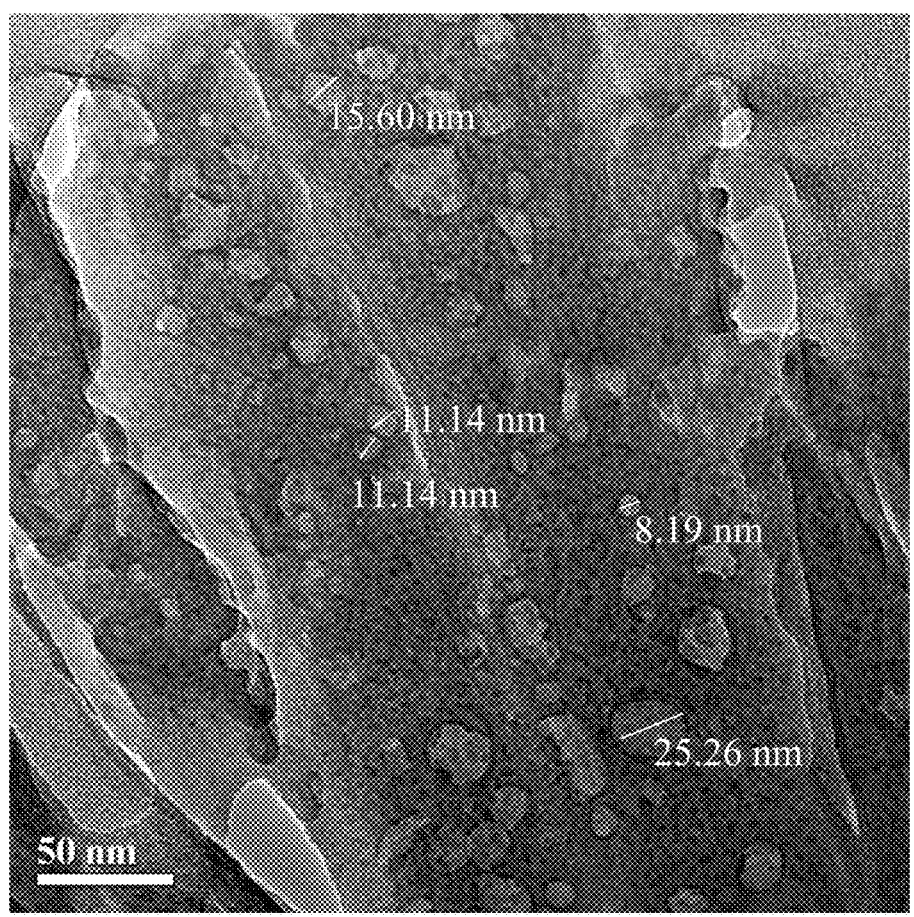
FIG. 2 is a transmission electronic microscopic (TEM) image of the inorganic material of the present disclosure.

FIG. 1A is an SEM image of waste LCD panel glass powder, and FIG. 1B is an SEM image of an inorganic material of the present disclosure. FIG. 2 is a TEM image of the inorganic material of the present disclosure.

FIG. 1A shows that waste LCD panel glass powder had a flat surface without pores, and FIG. 1B shows that the inorganic material of the present disclosure has a complex topography with a large number of pores. It can be further observed from the TEM image of FIG. 2 that the pores of the inorganic material of the present disclosure are nano-scale.

A specific surface area analyzer was used to determine the specific surface area of each of the inorganic materials using a BET method (i.e., measuring using a nitrogen adsorption isothermal line at a relative pressure of from 0.058 to 0.202), determine the pore diameter distribution of the each of the inorganic materials (i.e., measuring using a nitrogen desorption branch) and the proportion of each pore diameter in an accumulated pore volume (i.e., measuring using a nitrogen desorption isothermal line) using a BJH method. The specific surface area (i.e., BET specific surface area), average pore diameter (i.e., BJH-desorbed average pore diameter (4V/A)) and the proportion of pore diameters of from 3 to 50 nm in the pore volumes (i.e., the proportion of BJH desorption pores each with a diameter of from 3 to 50 nm in the desorbed, accumulated pore volume) in examples 1, 3 and 5 to 8 are listed in Table 3.

TABLE 3

| | Specific surface area (m$^2$/g) | Average pore diameter (nm) | Proportion of pore diameters of from 3 to 50 nm in the pore volume (%) |
|---|---|---|---|
| Unmodified waste LCD panel glass powder | 0.4 | None | None |
| Example 1 | 27.1 | 22.6 | 60.1 |
| Example 3 | 159.2 | 13.62 | 78.5 |
| Example 5 | 163.7 | 8.99 | 77.5 |
| Example 6 | 65.2 | 19.41 | 61.0 |
| Example 7 | 93.6 | 13.53 | 75.9 |
| Example 8 | 118.9 | 13.21 | 73.2 |

As shown in Table 3, the waste LCD panel glass powder did not contain pores, and the specific surface area of 0.4 m/g$^2$. On the contrary, the inorganic materials of the present disclosure had nano-scaled pores, wherein at least 60% of the pore volumes consisted of pore diameters of from 3 to 50 nm, and the specific surface areas of the inorganic materials were from 65.2 to 163.7 m$^2$/g. As compared with the specific surface area of waste LCD panel glass powder, the specific surface areas of the inorganic materials of the present disclosure increased by about 160 to 410 folds.

After the inorganic material in example 3 was dissolved in HF, an ICP/AES analysis was performed on the composition and component ratios of the inorganic material. The analytical results are listed in Table 4.

TABLE 4

| Component | Al$_2$O$_3$ | B$_2$O$_3$ | Barium oxide (BaO) | CaO | MgO | Sodium oxide (Na$_2$O) | SrO | SiO$_2$ |
|---|---|---|---|---|---|---|---|---|
| Weight (%) | 12.36 | 1.14 | 0.21 | 3.78 | 2.55 | 26.75 | 2.95 | 44.12 |

As shown in FIG. 4, the composition and the amount of each of the components of the inorganic material were different from those of the silicate powder shown in Table 1. Particularly, the weight ratio of the boron oxide in the porous silicate particles was significantly lower than the weight ratio of boron oxide in the silicate powder shown in Table 1.

The difference indicates that the pores generated by removing some of the born components from the LCD panel glass powder had nano-scaled pore diameters.

Figure 3A:
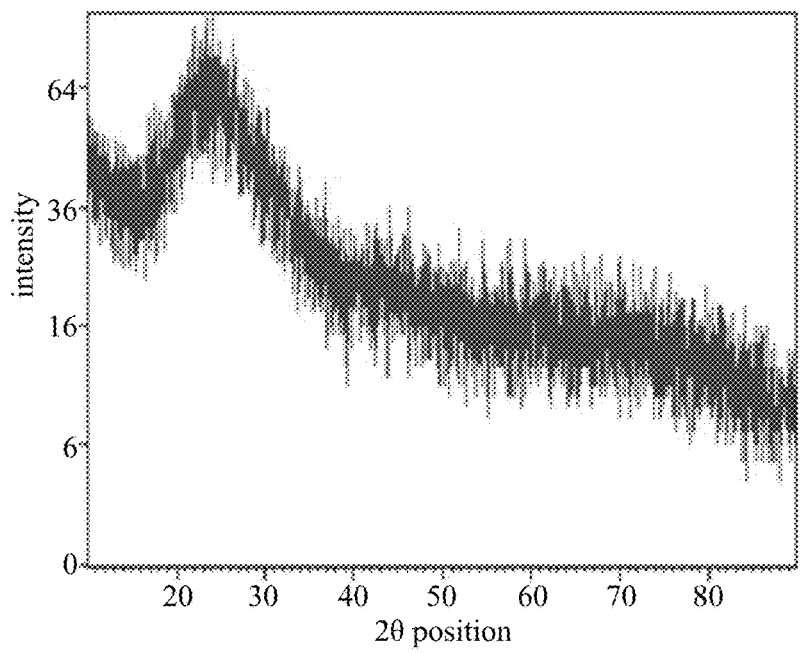
FIG. 3A is an X-ray diffraction (XRD) spectrum of the waste LCD panel glass powder.
Figure 3B:
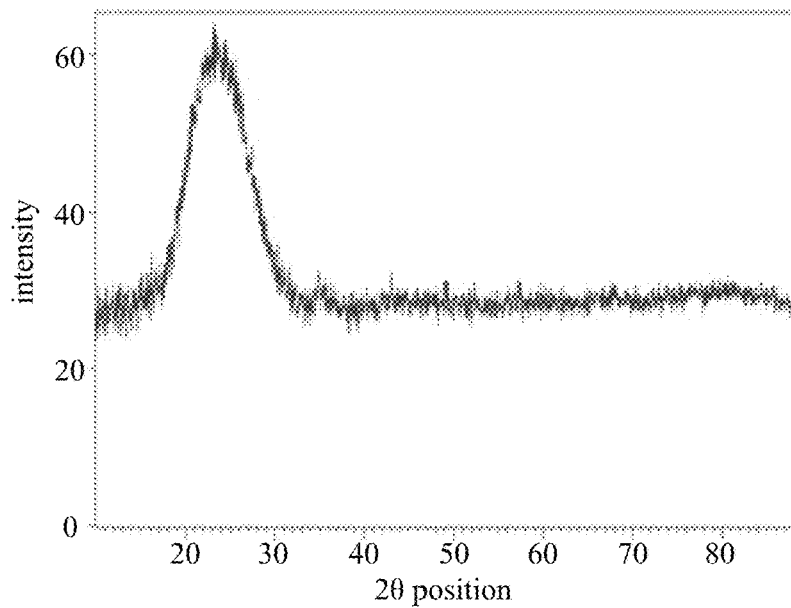
FIG. 3B is an XRD spectrum of the inorganic material of the present disclosure.

FIG. 3A is an XRD spectrum of waste LCD panel glass powder, and FIG. 3B is an XRD spectrum of the inorganic material of the present disclosure.

As shown in FIG. 3A, the waste LCD panel glass powder had an amorphous glass phase at the 2θ position (at 25°). Referring to FIGS. 3A and 3B, the inorganic material of the present disclosure had a similar spectral topography at the same 2θ position (25°), indicating that the inorganic material still maintained the same chemical structure of the glass phase as the unmodified waste LCD panel glass powder. It is clear that the inorganic material of the present disclosure had the same acid tolerance as LCD panel glass.

Figure 4A:
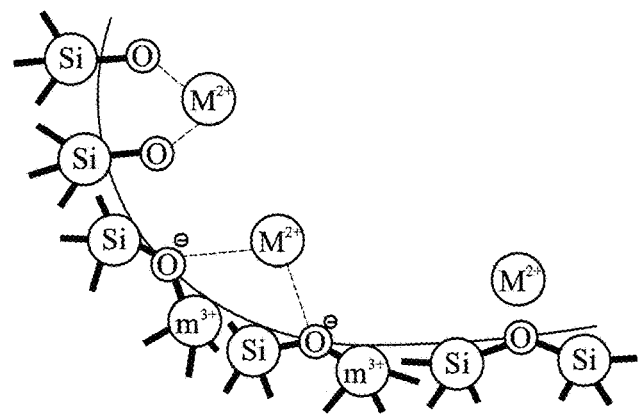
FIG. 4A is a schematic diagram of the surface structure of the porous silicate particles in an adsorbed state.
Figure 4B:
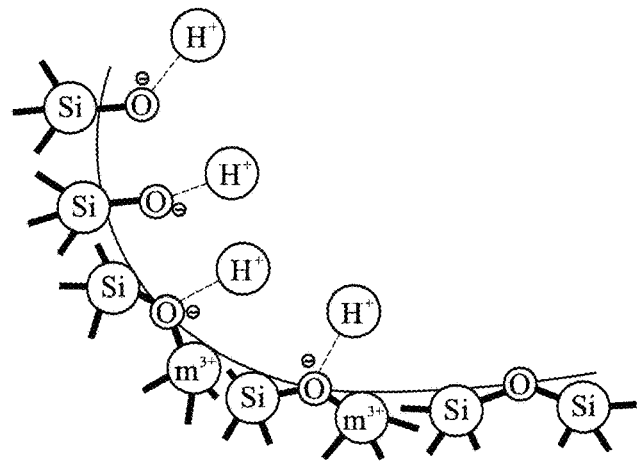
FIG. 4B is a schematic diagram of the surface structure of the porous silicate particles in a desorbed state.
Figure 4C:
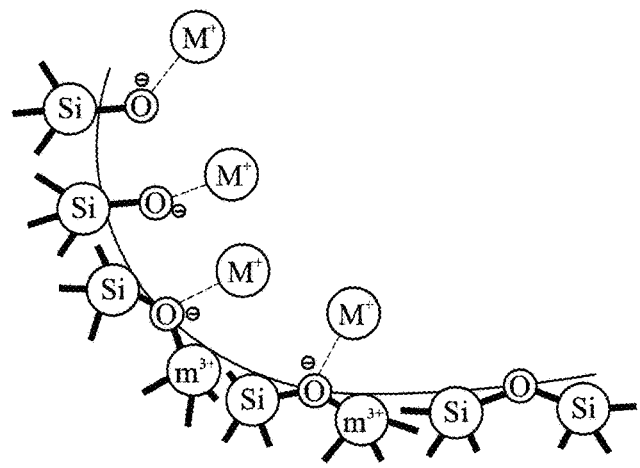
FIG. 4C is a schematic diagram of the surface structure of the porous silicate particles in a regenerated state.

FIGS. 4A to 4C are schematic diagrams of the surface structures of the porous silicate particles in the inorganic material of the present disclosure, wherein FIG. 4A is a schematic diagram of the surface structures of the porous silicate particles in an adsorbed state, FIG. 4B is a schematic diagram of the surface structures of the porous silicate particles in a desorbed state, and FIG. 4C is a schematic diagram of the surface structures of the porous silicate particles in a regenerated state.

As shown in FIGS. 4A to 4C, the surface structure of a porous silicate particle is indicated by Si—O-$m^{3+}$, a variable-charge site is indicated by Si—$O^-$, and an asymmetrical charge site is indicated by Si—$O^-$-$m^{3+}$. The variable-charge site and the asymmetrical charge site are both active sites with reactivity. Silicon dioxide to aluminum oxide in the components of a common silicate inorganic material is at a weight ratio (i.e., silicon aluminum ratio) of no greater than 2 The silicate structure with a high silicon aluminum ratio can generate a large number of asymmetrical charge sites to adsorb the ions in a solution. In the components of the porous silicate particles of the present disclosure, the silicon aluminum ratio was from 2 to 5, for example, 3 to 4. Therefore, the inorganic material of the present disclosure had higher ion adsorbability than an adsorption material containing conventional aluminum silicate.

In FIG. 4A, a heavy metal adsorbed onto a variable-charge site of the inorganic material is indicated by $M^{2+}$. For example, the heavy metal can be a heavy metal ion carries a positive charge of 2, but it is not limited thereto. In FIG. 4B, Si—O—$H^+$ indicates a surface hydroxyl group formed by desorbing the heavy metal at the variable-charge site by an acidic solution. In FIG. 4C, $M^+$ indicates an active metal ion formed at the variable-charge site after the inorganic material is regenerated by a basic solution. The active metal ion is, for example, an alkaline metal ion, but it is not limited thereto. As shown in FIGS. 4A to 4C, the surface structure of the inorganic material of the present disclosure ha a large amount of surface charges and also highly efficient cationic exchange capability.

The following test examples illustrate the method by adsorbing a heavy metal ion by using the inorganic material of the present application and the efficiency thereof.

Figure 5:
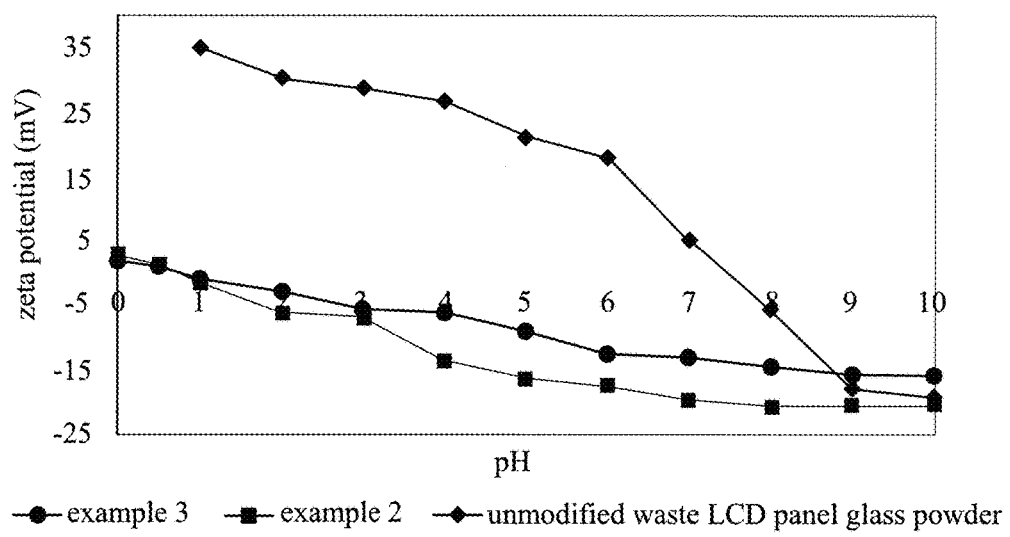
FIG. 5 is a diagram showing the relationship of the zeta potentials of the unmodified waste LCD panel glass powder and the inorganic material of the present disclosure and pH.
Figure 6A:
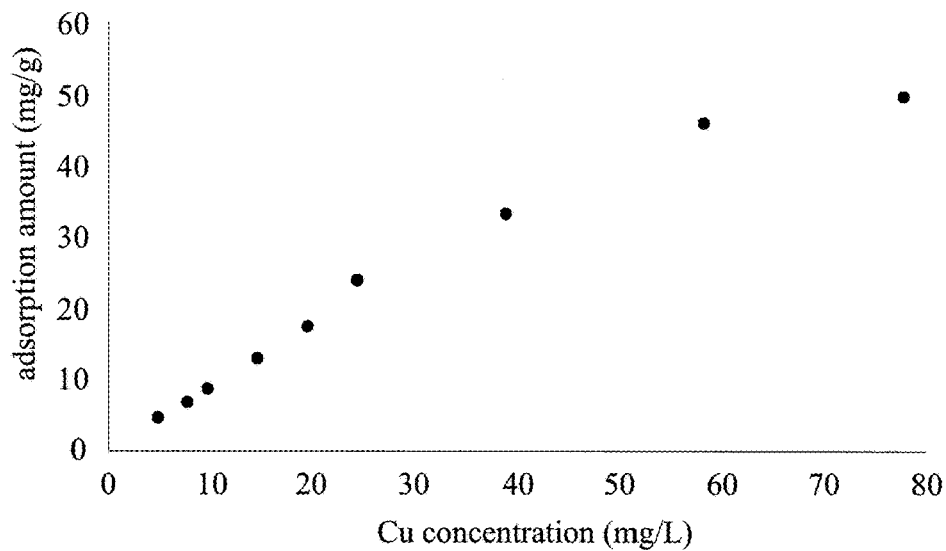
FIGS. 6A to 6F are diagrams showing the relationships of the adsorption onto the inorganic material of the present disclosure and various concentrations of copper (Cu), nickel (Ni), cadmium (Cd), chromium (Cr), zinc (Zn), and lead (Pb)
Figure 6B:
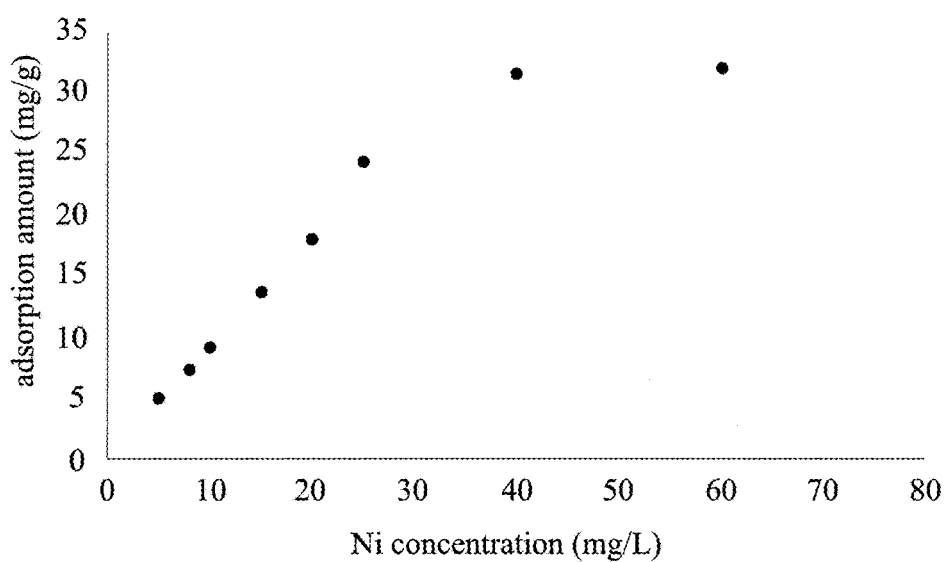
Figure 6C:
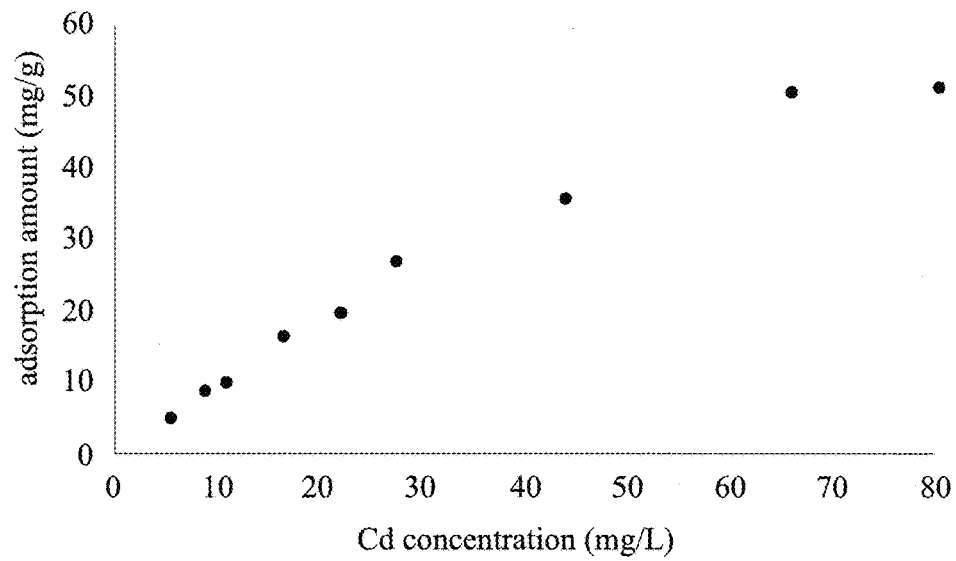
Figure 6D:
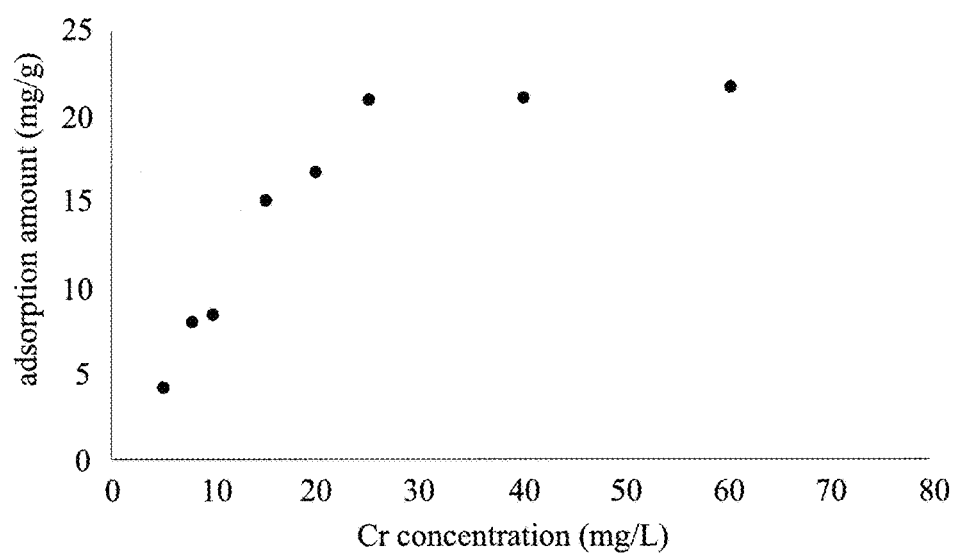
Figure 6E:
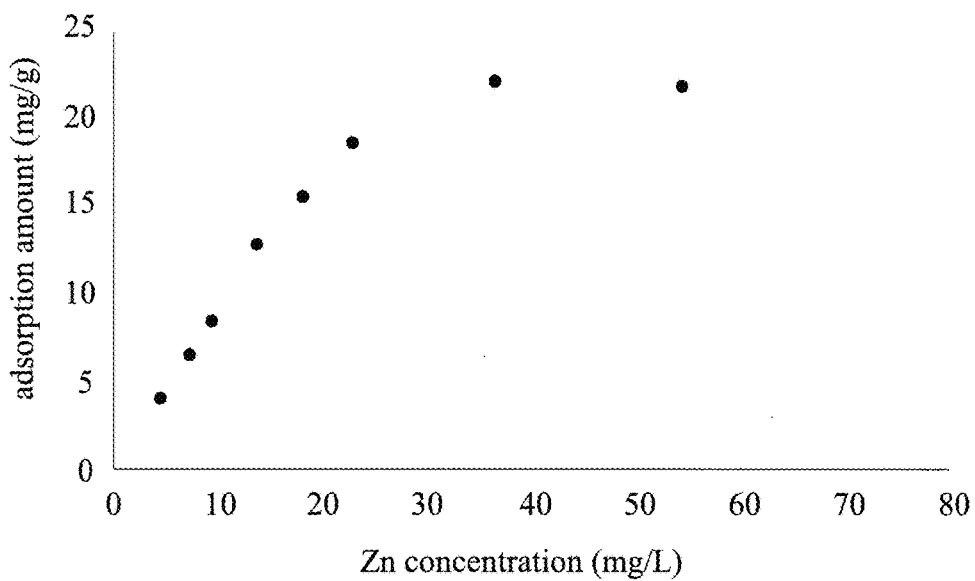
Figure 6F:
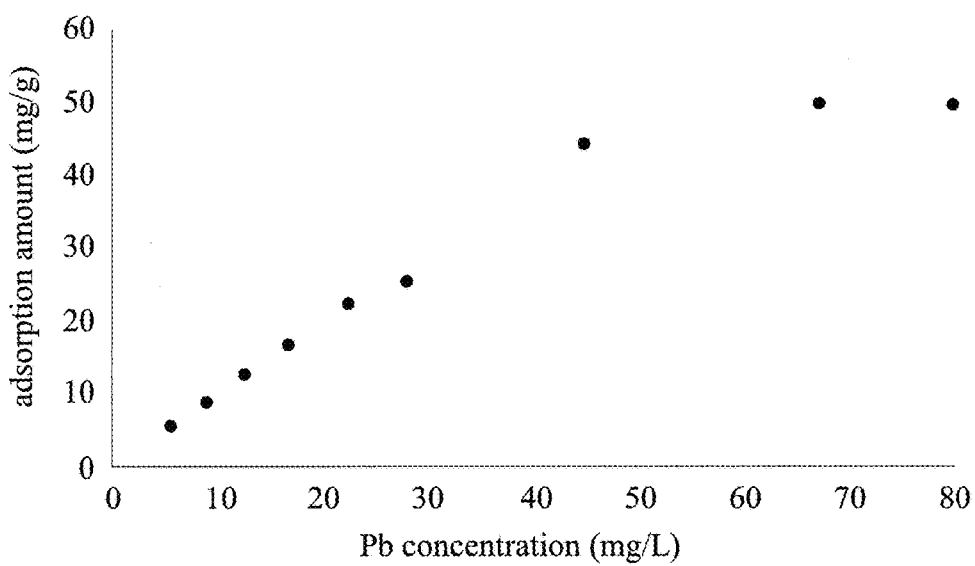

Test Example 1 Exchange Capability of Surface Charges of Inorganic Materials and Cations The inorganic materials in examples 2 and 3 and the unmodified waste LCD panel glass powder were selected for use. A zeta potential analyzer was used to determine the zeta potential of each of the inorganic materials at different pH conditions using electrophoretic light scattering (ELS), and zeta potential (mV) was plotted against pH (i.e., from pH 0 to 10) to calculate the isoelectric points (ZPC) of the inorganic materials and the unmodified waste LCD panel glass powder. FIG. 5 is a diagram showing the relationship of the zeta potentials of the unmodified waste LCD panel glass powder and the inorganic materials of the present disclosure and pH.

As shown in FIG. 5, the isoelectric point (i.e., a zeta potential of less than 1) of the unmodified waste LCD panel glass powder appeared at a pH of about 8.0. This indicates that in an environment at a pH of less than 8.0, the positively-charged surfaces of the unmodified waste LCD panel glass powder repelled heavy metal ions, such that the heavy metal ions cannot be adsorbed by the surfaces from wastewater. The isoelectric points of the inorganic materials in examples 2 and 3 appeared at pH of about 0.8. This indicates that even in a strongly acidic environment at a pH of from 1 to 5, the surfaces of the inorganic materials containing components with high aluminum silicon ratios were still negatively charged, such that the positively-charged heavy metal ions can be adsorbed by the inorganic materials can adsorb from an acidic solution. The analytical results show that the cationic exchange capability of the inorganic material of the present disclosure could be reach 27 meq/100 g.

Test Example 2 Maximum Adsorption Capability of Inorganic Materials for a Single Metal Ion The adsorbability of a single metal ion by the inorganic material in example 3 was performed using 6 types of heavy metal ions, including copper, nickel, lead, zinc, cadmium and chromium. A Langmuir model in a monolayer adsorption mode was used to calculate the maximum adsorption capability (mg/g) per gram of the inorganic material to adsorb a single heavy metal ion. Test solutions each with a volume of 100 mL, and containing each of the heavy metal ions at concentrations of 5, 8, 10, 15, 20, 25, 40, 60 and 80 mg/L, respectively, were formulated. Regarding each of the test solutions, 0.1 g of the inorganic material was added, and the pH was adjusted to 3 to simulate electroplating wastewater and soil acid wash. An adsorbability test was conducted for 24 hours. A filter membrane was used to filter each of the test solutions, and an ICP/AES analysis was then directly performed to determine the amounts of the adsorbed heavy metal ions.

FIGS. 6A to 6F are diagrams showing the relationships of the adsorption onto the inorganic material of the present disclosure and various concentrations of copper (Cu), nickel (Ni), cadmium (Cd), chromium (Cr), zinc (Zn), and lead (Pb). FIG. 5 shows the maximum adsorption capability of the inorganic material for a single heavy metal ion, as calculated by the Langmuir model.

TABLE 5

| Heavy metal ion | Maximum adsorption capability $q_{max}$ (mg/g) | Equilibrium constant K (L/g) | Regression analysis parameter of determination $R^2$ |
|---|---|---|---|
| Cu | 50.0 | 3.33 | 0.9981 |
| Ni | 31.9 | 13.6 | 0.9999 |
| Cd | 52.6 | 3.80 | 0.9996 |
| Cr | 21.7 | 9.2 | 0.9999 |
| Zn | 22.1 | 2.42 | 0.9989 |
| Pb | 50.2 | 7.11 | 0.9993 |

As shown in Table 5, the inorganic material of the present disclosure in strong acid (pH=3) not only had the capability to adsorb heavy metal ions, but also showed maximum adsorption capability of 50.0 (mg/l) for Cu, 31.9 (mg/g) for Ni, 52.6 (mg/g) for Cd, 21.7 (mg/g) for Cr, 22.1 (mg/g) for Zn, and 50.2 (mg/g) for Pb.

Test Example 3 Adsorption of Arsenic-Containing Wastewater by Inorganic Materials An As-containing test solution with an initial concentration of 110 (mg/L) was formulated. 2 g of the inorganic materials of examples 3 and 6 were added to a fixed volume of 200 mL of the test solution, respectively. The mixtures were oscillated in a reciprocatory motion on an oscillator at 180 rpm for 60 minutes. A 0.45 filter membrane was used to filter each of the test solutions, and an ICP/AES analysis was directly performed to determine the amount of As after the adsorption. The test results of the adsorbability using the As-containing wastewater by the inorganic materials are listed in Table 6.

TABLE 6

|  | Initial As concentration (mg/L) | Concentration after As adsorption (mg/L) | Removal rate (%) |
|---|---|---|---|
| Example 3 | 110 | 60.5 | 45.0 |
| Example 6 | 110 | 16.7 | 84.8 |

As shown in Table 6, the inorganic materials made by mixing and melting different mixing portions of the metal compound could effectively increase the removal rate of As from 45% to 84.8%.

Test Example 4 Maximum Adsorption Amount of Actual Wastewater by Inorganic Materials of the Present Disclosure An adsorption experiment was conducted on the inorganic materials of examples 3, 4 and 5 by using many types of heavy metals in the electroplating wastewater obtained from a plant, so as to determine whether the inorganic materials of the present disclosure had adsorption capability for electroplating wastewater having complicated components. 100 mL of acidic or basic electroplating wastewater containing heavy metal ions like Cr, Cu, Ni and Zn was added with 1 wt % (1 g) of the inorganic materials in examples 3-5, respectively, for an adsorption analysis. The test conditions were an oscillation intensity of 180 rpm, an adsorption time of 60 minutes, and an adsorption temperature of 25° C. After the adsorption test, an ICP-AES analysis was performed on the concentrations of the heavy metal ions in the electroplating wastewater. The maximum adsorption amounts and removal rates of the various types of heavy metal ions in the electroplating wastewater by using the inorganic materials are listed in Table 7.

TABLE 7

|  |  | Cr | Cu | Ni | Zn |
|---|---|---|---|---|---|
| Initial concentration (mg/L) |  | 33.1 | 32.1 | 38.3 | 27 |
| Example 3 | Concentration after adsorption (mg/L) | 0.22 | 0.16 | 17.7 | 0.25 |
|  | Adsorbed amount (mg/g) | 3.26 | 3.19 | 2.04 | 2.65 |
|  | Total adsorbed amount (mg/g) |  | 11.14 |  |  |
|  | Removal rate (%) | 99.9 | 99.9 | 53.82 | 99.9 |

TABLE 7-continued

|  |  | Cr | Cu | Ni | Zn |
|---|---|---|---|---|---|
| Example 4 | Concentration after adsorption (mg/L) | 0.18 | 0.11 | 14.9 | 0.12 |
|  | Adsorbed amount (mg/g) | 3.20 | 3.11 | 2.27 | 2.61 |
|  | Total adsorbed amount (mg/g) |  | 11.19 |  |  |
|  | Removal rate (%) | 99.9 | 99.9 | 61.07 | 99.9 |
| Example 5 | Concentration after adsorption (mg/L) | 0.17 | 0.08 | 13.66 | 0.08 |
|  | Adsorbed amount (mg/g) | 3.29 | 3.20 | 2.47 | 2.69 |
|  | Total adsorbed amount (mg/g) |  | 11.66 |  |  |
|  | Removal rate (%) | 99.9 | 99.9 | 64.36 | 99.9 |

As shown in Table 7, the inorganic materials with different compositions all had adsorption capability for various types of heavy metal ions in the acidic or basic electroplating wastewater, and the maximum adsorption amount stably reached 11 mg/g or higher.

The followings are test examples of the inorganic materials of the present disclosure in the treatment of various types of wastewater conformity to the EU (EPA) effluent standard for harmful substances in effluent.

Test Example 5 Treatment of Simulated Industrial Wastewater by Inorganic Materials Aqueous nitrate solutions containing As, Pb, Cd, Cr, Ni, Cu and Zn were formulated in a laboratory to simulate industrial wastewater containing various types of harmful substances. ICP-AES was used to determine the initial concentration of each of the harmful substances. 20 g of each of the inorganic materials in examples 1, 2, 9 and 10 were added to 200 g of the simulated industrial wastewater (the amount added was 10% w/w, as calculated from the weight percents of the inorganic materials based on the simulated industrial wastewater), respectively, and oscillated to adsorb. The treatment conditions were an oscillation intensity of 180 rpm, an adsorption time of 30 minutes, and an adsorption temperature of 25° C. The concentrations of the substances in the simulated industrial wastewater after adsorption are listed in Table 8.

TABLE 8

| Harmful substance |  | As | Cd | Cr | Cu | Ni | Pb | Zn |
|---|---|---|---|---|---|---|---|---|
| Effluent standard (ppm) |  | <0.5 | <0.03 | <2 | <3 | <1 | <1 | <5 |
| Initial concentration (ppm) |  | 109.1 | 116.8 | 114.4 | 114.8 | 115.3 | 110.9 | 110.7 |
| Example 1 | Concentration after adsorption (ppm) | 28.2 | 105.5 | 56.1 | 93.3 | 71.2 | 33.1 | 97.2 |
|  | Removal rate (%) | 74.2 | 9.7 | 51.0 | 18.8 | 38.3 | 70.1 | 12.2 |
| Example 2 | Concentration after adsorption (ppm) | 36.4 | 106.4 | 67.0 | 95.3 | 71.3 | 49.8 | 98.9 |
|  | Removal rate (%) | 66.7 | 8.9 | 41.4 | 17.0 | 38.1 | 55.1 | 10.6 |

TABLE 8-continued

| Harmful substance | | As | Cd | Cr | Cu | Ni | Pb | Zn |
|---|---|---|---|---|---|---|---|---|
| Example 9 | Concentration after adsorption (ppm) | 18.9 | 105.4 | 47.2 | 91.1 | 64.8 | 36.0 | 96.4 |
| | Removal rate (%) | 82.6 | 9.8 | 58.8 | 20.6 | 43.8 | 67.5 | 12.9 |
| Example 10 | Concentration after adsorption (ppm) | 16.7 | 95.3 | 44.0 | 82.8 | 56.2 | 40.3 | 86.0 |
| | Removal rate (%) | 84.7 | 18.4 | 61.6 | 27.9 | 51.3 | 63.7 | 22.3 |

As shown in Table 8, the various types of the harmful substances could be adsorbed onto the inorganic materials from the simulated industrial wastewater. However, competitive adsorption was also observed, and the order of competitive adsorption of the harmful substances by the inorganic materials were As>Pb>Cr>Ni>Cn>Zn>Cd.

Test Example 6 Multiple Times of Treatments of Cyanogen-Based Industrial Wastewater Obtained from an Actual Plant by an Inorganic Material The initial pH of the cyanogen-based industrial wastewater was 2.37. Without adjusting the pH, 10 g of the inorganic material in example 3 was added to 200 g of the cyanogen-based industrial wastewater (the amount added was 5% w/w, as calculated from the weight percents of the inorganic material based on the cyanogen-based industrial wastewater) for multiple times of oscillation to adsorb. The treatment conditions were an oscillation intensity of 180 rpm, an adsorption time of 30 minutes, and an adsorption temperature of 25° C. After the treatment, an ICP-AES analysis was performed on the concentrations (ionic concentrations) of the harmful substances in the cyanogen-based industrial wastewater. The measured concentrations of the harmful substances are listed in Table 9.

TABLE 9

| | Harmful substance | | | |
|---|---|---|---|---|
| | Cr | Cu | Pb | Zn |
| Effluent standard (ppm) | <2 | <3 | <1 | <5 |
| Initial concentration (ppm) | 0.72 | 434 | 22.7 | 111 |
| Concentration after $1^{st}$ adsorption (ppm) | 0.01 | 61.7 | 0.20 | 103 |
| Removal rate after $1^{st}$ adsorption (%) | 98.7 | 85.8 | 99.1 | 7.2 |
| Concentration after $2^{nd}$ adsorption (ppm) | <0.1 | 15.4 | <0.1 | 39.2 |
| Removal rate after $2^{nd}$ adsorption (%) | — | 75.0 | — | 61.9 |
| Concentration after $3^{rd}$ adsorption (ppm) | <0.01 | <0.1 | <0.1 | 0.11 |
| Removal rate after $3^{rd}$ adsorption (%) | — | — | — | 99.7 |

As shown in Table 9, before the first adsorption, the initial Cr concentration was already below the effluent standard. After the first adsorption, the Cr concentration reduced to an undetectable concentration of an apparatus. The Cu concentration reduced from 434 ppm to 61.7 ppm, the Pb concentration reduced from 22.7 ppm to 0.20 ppm (conforming the legal effluent standard of <1 ppm), and the Zn concentration reduced from 111 ppm to 103 ppm.

After the second adsorption, the Cr concentration kept below the effluent standard, and the introduction of the inorganic material did not cause desorption of the harmful substance. The Cu concentration reduced from 61.7 ppm to 15.4 ppm, the Pb concentration further reduced from 0.20 ppm to less than 0.1 ppm, and the Zn concentration reduced from 103 ppm to 39.2 ppm.

After the third adsorption, the introduction of the inorganic material did not cause desorption of the harmful substance. The Cu concentration reduced from 15.4 ppm to less than 0.1 ppm, and the Zn concentration reduced from 39.2 ppm to 0.11 ppm. Both of the substances have conformed to the legal effluent standard.

Competitive adsorption was observed from the data shown in Table. 9, and the order of competitive adsorption in the industrial wastewater having this type of composition was Pb>Cr>Cu>Zn. During the first adsorption, the adsorption of Cu onto the inorganic material was higher than the adsorption of Zn onto the inorganic material. Therefore, the change in the Zn concentration during the first adsorption was not obvious. During the second adsorption, the adsorption of Zn onto the inorganic material significantly increased. During the third adsorption, the inorganic material mainly adsorbed Zn. After the third adsorption, the Zn concentration conformed to the legal effluent standard.

Moreover, the pH of the cyanogen-based industrial wastewater measured after the first adsorption was 9.3, the pH of the cyanogen-based industrial wastewater measured after the second adsorption was 9.2, and the pH of the cyanogen-based industrial wastewater after the third adsorption was 9.1. In this test example, no additional treatment was performed to adjust the pH (i.e., the initial pH of about 3) of the cyanogen-based industrial wastewater before the adsorptions. The harmful substances in the treated cyanogen-based industrial wastewater conformed to the legal effluent standard, and the pH of the treated cyanogen-based industrial wastewater also approached the standard of neutral water (i.e., pH of from 6 to 9).

Test Example 7 Multiple Times of Treatments of Acidic Industrial Wastewater Obtained from an Actual Plant by an Inorganic Material The initial pH of acidic industrial wastewater was 3.45. Under a condition that the pH of the wastewater was not adjusted, 10 g of the inorganic material in example 11 was added to 200 g of the acidic industrial wastewater (i.e., the amount added was 5% w/w, as calculated from the weight percents of the inorganic material based on the industrial wastewater), and oscillation was performed in batches for adsorption. The treatment conditions were an oscillation intensity of 180 rpm, an adsorption time of 30 minutes, and an adsorption temperature of 25° C. After the treatment, an ICP-AES analysis was performed on the concentrations (ionic concentrations) of the harmful substances in the acidic industrial wastewater. The measured concentrations of the harmful substances are listed in Table 10.

TABLE 10

| | Harmful substance | | | |
|---|---|---|---|---|
| | Cr | Cu | Pb | Zn |
| Effluent standard (ppm) | <2 | <3 | <1 | <5 |
| Initial concentration (ppm) | 39.4 | 35.5 | 0.19 | 30.0 |
| Concentration after the 1$^{st}$ adsorption (ppm) | <0.1 | 1.90 | 0.14 | <0.1 |
| Removal rate after the 1$^{st}$ adsorption (%) | 99.8 | 94.7 | 28.0 | 99.9 |
| Concentration after the 2$^{nd}$ adsorption (ppm) | <0.1 | 1.17 | <0.1 | <0.1 |
| Removal rate after the 2$^{nd}$ adsorption (%) | — | 38.0 | — | — |

As shown in Table 10, before the first adsorption, the initial Pb concentration was already below the effluent standard. During the first adsorption, the introduction of the inorganic material did not cause desorption of the harmful substances. After the first adsorption, the concentration of the harmful substance Cr reduced from 39.4 ppm to less than 0.1 ppm (which had conformed to the effluent standard), the Cu concentration reduced from 35.5 ppm to 1.90 ppm (which had conformed to the effluent standard), and the Zn concentration reduced from 30.0 ppm to less than 0.1 ppm (which had conformed to the effluent standard). It can be observed from the removal rates of various types of harmful substances listed in Table 10 that most of the harmful substances have been removed after the acidic industrial wastewater was subjected to the first adsorption, and the acidic industrial wastewater had reached the effluent standard after the first adsorption. Further, the measured pH of the industrial wastewater after the first adsorption was 6.1, and the measured pH of the industrial wastewater after the second adsorption was 6.7. Apparently, the pH of the treated acidic industrial wastewater also conformed to the standard of neutral water of effluent.

Test Example 8 Reliability Test on an Inorganic Material

A test of 5 cycles of adsorption-regeneration-adsorption was performed on 3 g of an inorganic material saturated with the adsorbed heavy metals in the acidic industrial wastewater. For the inorganic material, the adsorption and desorption amounts were measured after every cycle, and the first adsorption amount was used as a basis to calculate the maintenance rate of adsorption capability of the inorganic material. As such, the reliability of the inorganic material was obtained.

For desorption of the inorganic materials under an acidic condition, inorganic acids, such as citric acid, sulfuric acid, nitric acid, hydrochloric acid, can be used as desorbents. In this test example, nitric acid was formulated into a desorbent. The weight of the desorbed heavy metal per gram of the inorganic material was calculated, and the desorption amount of the inorganic material was calculated. Desorption conditions R1, R2 and R3 are listed in Table 11.

The desorbed inorganic material was added to a regeneration tank filled with water (the desorbed inorganic material and water was at a weight ratio of 1:1). 1M of sodium hydroxide solution was added to the regeneration tank, until the solution in the tank become basic (i.e., pH of 9). As such, the regeneration of the inorganic material was completed.

The regenerated inorganic material was subjected to adsorption-desorption again to measure the adsorption and desorption amounts of the inorganic material after each regeneration. The first adsorption amount of the inorganic material was used as a basis to calculate the maintenance rate of the adsorption capability of the inorganic material for the heavy metal after each adsorption and desorption, so as to conceive the reliability of the inorganic material being recycled for use. The results of the reliability test are listed in Table 12.

TABLE 11

| Desorption condition | Nitric acid concentration (wt %) | Time (mins) |
|---|---|---|
| R1 | 4 | 5 |
| R2 | 4 | 20 |
| R3 | 5 | 20 |

TABLE 12

| Reliability test | | Desorption condition R1 | Desorption condition R2 | Desorption condition R3 |
|---|---|---|---|---|
| First | Adsorption amount (mg/g) | 7.5 | 7.5 | 7.5 |
| | Desorption amount (mg/g) | 3.0 | 5.4 | 3.0 |
| | Desorption rate (%) | 34.9 | 62.8 | 35.3 |
| Second | Adsorption amount (mg/g) | 6.1 | 6.5 | 6.4 |
| | Desorption amount (mg/g) | 5.2 | 5.7 | 5.2 |
| | Desorption rate (%) | 85.3 | 88.6 | 80.6 |
| | Maintenance rate of adsorption capability (%) | 81.3 | 86.7 | 85.3 |
| Third | Adsorption amount (mg/g) | 6.2 | 6.4 | 6.5 |
| | Desorption amount (mg/g) | 3.9 | 4.5 | 4.2 |
| | Desorption rate (%) | 58.4 | 64.8 | 59.2 |
| | Maintenance rate of adsorption capability (%) | 82.7 | 85.3 | 86.7 |
| Fourth | Adsorption amount (mg/g) | 6.6 | 7.1 | 6.5 |
| | Desorption amount (mg/g) | 4.1 | 4.7 | 4.3 |
| | Desorption rate (%) | 62.1 | 66.2 | 62.8 |
| | Maintenance rate of adsorption capability (%) | 88.0 | 94.7 | 85.3 |
| Fifth | Adsorption amount (mg/g) | 6.7 | 6.8 | 6.5 |
| | Desorption amount (mg/g) | 4.3 | 4.5 | 4.2 |
| | Desorption rate (%) | 64.2 | 66.1 | 60.8 |
| | Maintenance rate of adsorption capability (%) | 89.3 | 90.7 | 86.7 |

As shown in Table 12, the inorganic material of the present disclosure could still maintain an adsorption efficiency of 80% or higher after multiple times of adsorptiondesorption-regeneration. Hence, the inorganic material of the present disclosure could indeed be recycled for use many times.

In summary of the test examples above, it can be observed from FIGS. 1B and 2 that the glass in an LCD panel generates a pore topography due to the reconfiguration of components and rearrangement of the structure, from test example 2 that the inorganic material is in a Langmuir monolayer adsorption mode, from FIG. 3B that the inorganic material has tolerance to strong acid, from test example 3 that the inorganic material has the ability to adsorb As, from test example 4 that the total adsorption amount of various harmful substances onto the inorganic material could be higher than 11.66 mg/g, from test examples 5-7 that the treatments of various types of plant wastewater by the inorganic material can all conform to the legal effluent standard, and from test example 8 that the inorganic material is verified by the reliability test as being capable of being recycled for use may times via desorption and regeneration.

In the present disclosure, a metal compound reconfigures the composition and chemical structure of waste LCD panel glass, thereby obtaining an inorganic material including porous silicate particles having a glass phase structure. The porous silicate particles of the present disclosure can be used to treat the harmful substances in strongly acidic wastewater as an inorganic material. Not only that the treated strongly acidic wastewater can conform to an effluent standard, but also the inorganic material adsorbed with the harmful substances can be recycled for use via desorption and regeneration.

Test Example 9 Comparison of Conventional Silica Sand and the Inorganic Material in Example 3 (Hereinafter Referred to as MCL Material) in the Adsorption of Boron (B)-Containing Wastewater Boron-containing wastewater having an initial concentration of 200 (mg/L) was formulated for a wastewater treatment by fluidized bed crystallization. The wastewater and crystal precursor (i.e., barium chloride) were fed into the fluidized bed reactor 1 containing the support 2 via the pipeline 11, so as for the harmful substances to crystallize on the support 2. The harmful substances were then recycled, and fed out as treated wastewater via the pipeline 12.

Conventional silica sand and the MCL material were used as the support 2, respectively, and assessment was performed under the same conditions: the wastewater feeding stream (15 mL/min), crystal precursor (barium chloride, concentration: 0.37 M), and pH (from 8.5 to 11.5). The filling level of the two types of support was fixed to 55 g. It was found that the height of conventional silica sand support bed was 11.8 cm. Since the height of the MCL material support bed caused the volume to expand due to low density, the height of the bed was 28.1 cm. It is also found that the flow rate required by the refluxing force by the conventional silica sand support was 240 ml/min, whereas the flow rate required by the refluxing force by the MCL material support was 40 mL/min Therefore, the refluxing force required by the MCL material support was ⅙ of the conventional silica sand support, and the overall refluxing force reduced by 83%.

As shown in Table 13, the density of the MCL material was low. The MCL material can effectively reduce the refluxing force of the fluidized bed reactor when being used as a support, such that the energy consumption and cost can be reduced. Further, the specific surface area of the MCL material was way higher than that of the conventional silica sand, such that a larger crystallizing surface can be provided, and thereby effective increasing the boron crystallization rate and boron removal rate.

TABLE 13

|  | Conventional silica sand | MCL material |
| --- | --- | --- |
| Specific density (g/cm$^3$) | 2.66~2.67 | 0.57~0.65 |
| Particle diameter (mm) | 0.4~0.6 | 0.2~0.3 |
| Specific surface area (m$^2$/g) | 2.06 | 174.6 |
| Crystallizing surface (m$^2$/m$^3$) | 7.71*10$^5$~7.75*10$^5$ | 2.68*10$^8$~3.06*10$^8$ |

It can be observed that, during the treatment of wastewater with the two types of support, the conventional silica sand was filled with white precipitate after 1 day of reaction, and the interior of the MCL material was a transparent solution. It was also found that after 5 days of reaction, the feeding outlet on the conventional silica sand support was filled with white precipitate, whereas the feeding outlet was still a transparent solution. This can prove that the use of the MCL material in the fluidized bed reactor as a support could reduce the sludge formation from the boron-containing wastewater, and substantially reduce the cost of secondary sludge treatment.

Figure 8:
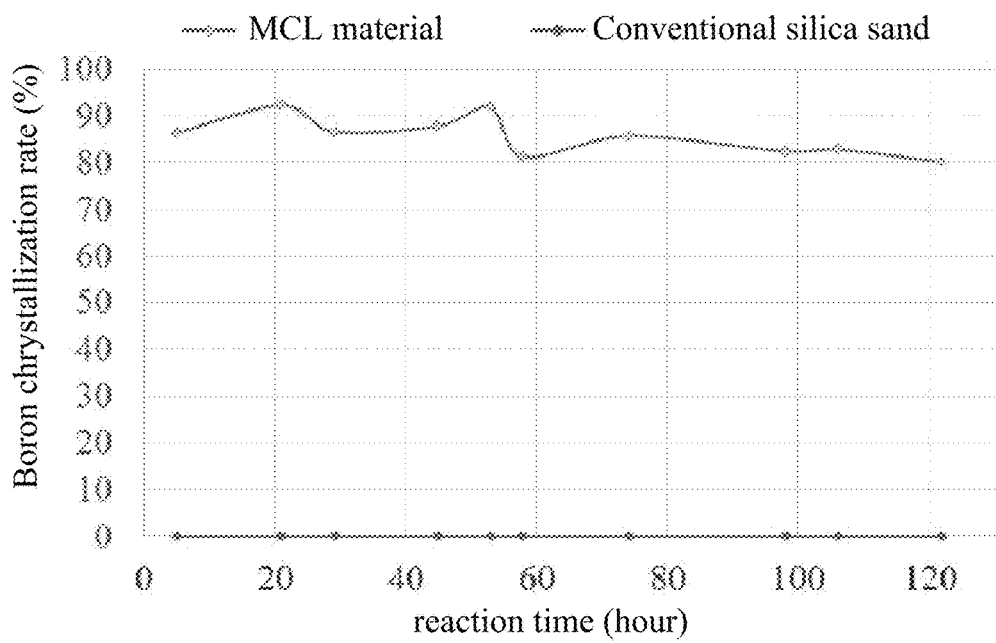
FIG. 8 is a comparative diagram showing the boron crystallization rates of an inorganic material (i.e., MCL material) support of the present disclosure and a conventional silica sand support.
Figure 9:
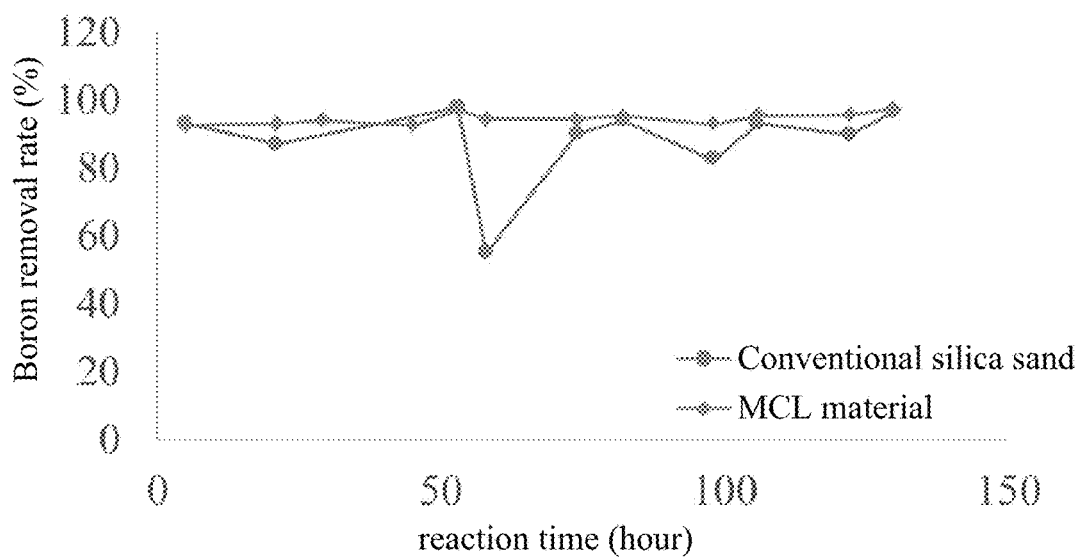
FIG. 9 is a comparative diagram showing the boron removal rates of the MCL material support and the conventional silica sand support.
Figures 10A, 10B:
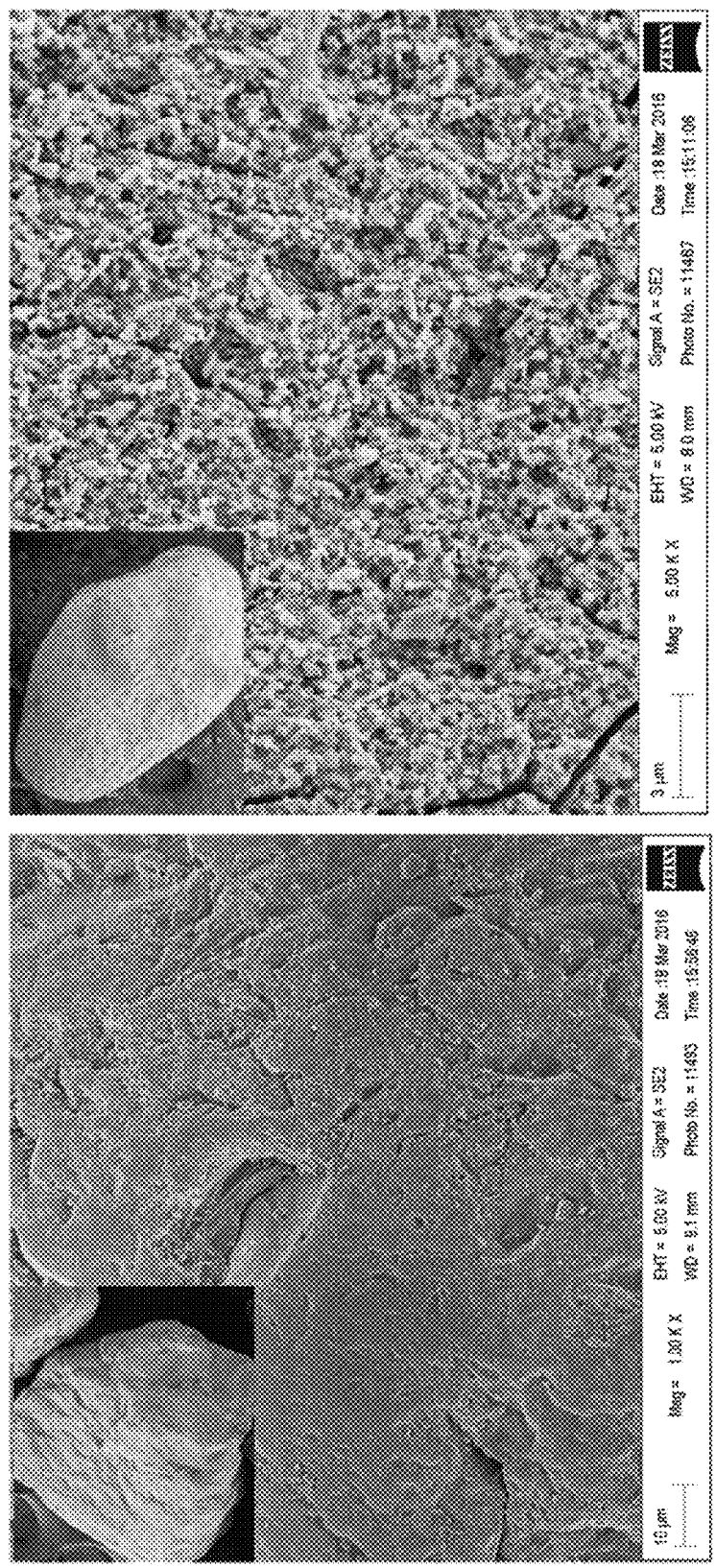
FIGS. 10A and 10B are SEM surface images of the conventional silica sand support before a reaction and after 5 days of reaction, respectively.
Figure 10D:
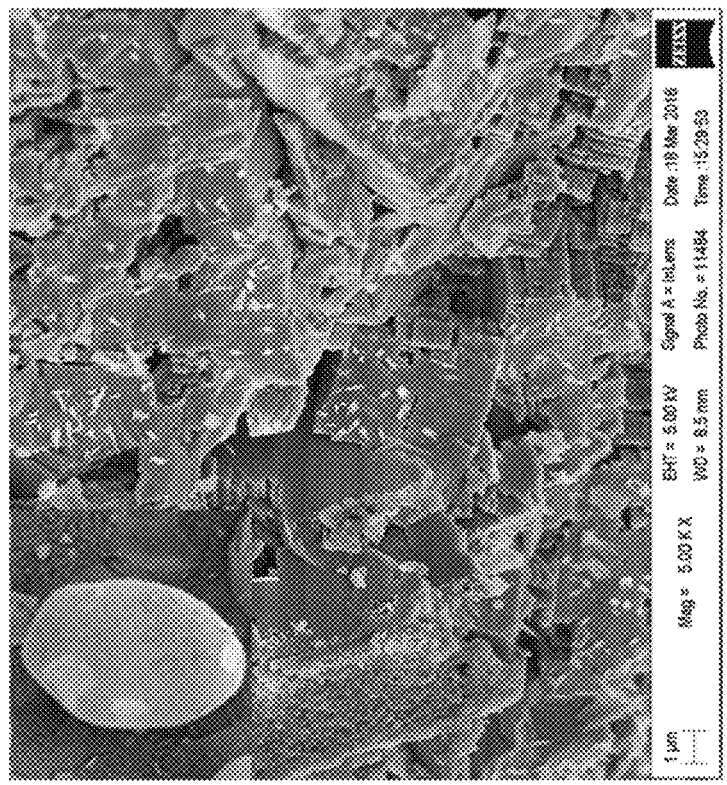
FIGS. 10C and 10D are SEM surface images of the MCL material support before a reaction and after 5 days of reaction, respectively.
Figure 10C:
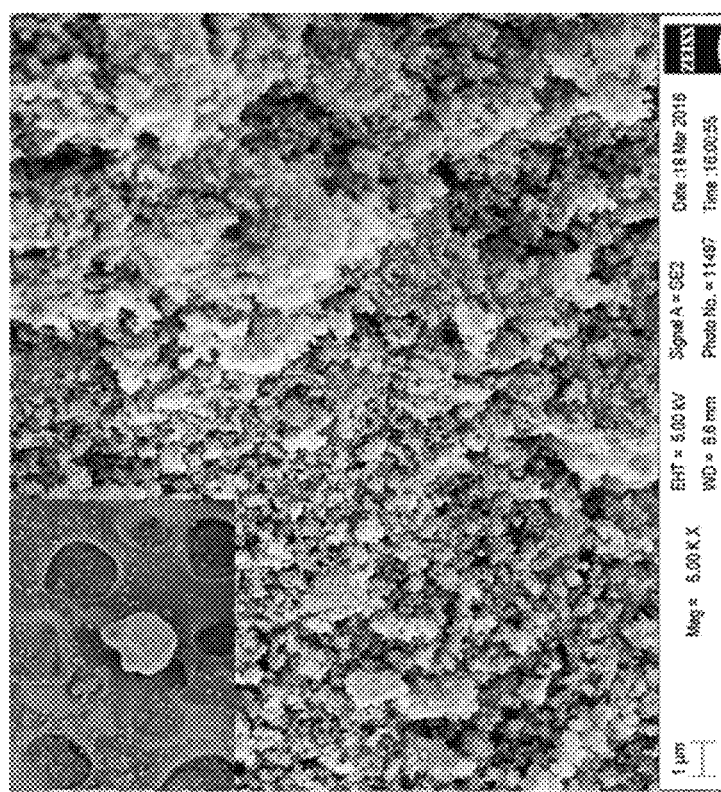

The boron removal rate and the boron crystallization rate for the wastewater subjected to the treatment of the two supports were measured. As shown in FIG. 8, the MCL material support initially had boron crystals. The crystallization rate reached 85% after 5 hours of reaction, and the maximum crystallization rate was 92.3%. The crystallization rate was maintained at 80% or higher, even after 5 days of reaction. On the contrary, no crystals were observed on the conventional silica sand support after 5 days of reaction. As shown in FIG. 9, the MCL material support was able to maintain a stable and high boron removal rate (92% or above), because the conventional silica sand support did not have any crystallizing effect after 5 days of reaction. The conventional silica sand removed boron by forming precipitate, such that the removal rate was unstable, and thereby forming a large amount of sludge. As a result, the feeding outlet is likely to be blocked during feeding, causing problems like easy damages to the operating equipments. No sludge was formed on MCL material support, such that the problems associated with sludge treatment were not found. Moreover, the conventional silica sand and the MCL material supports were subjected to a microstructure (SEM) identification. FIG. 10A shows that the surfaces of the silica sand support were compact, and contained no pores before a reaction. FIG. 10C shows that the surfaces of the MCL material support were evenly rough, and had pores before a reaction. Further, the surfaces of the crystals had interlaced pores, on which the next stage of crystal growth begins. On the fifth day of the reaction, FIG. 10B shows that on the surfaces of the conventional silica sand support were stacked with precipitate from the reaction, and an amorphous state was formed. FIG. 10D shows that the surfaces of the MCL material support were covered with crystalline crystals.

Figures 11A, 11B:
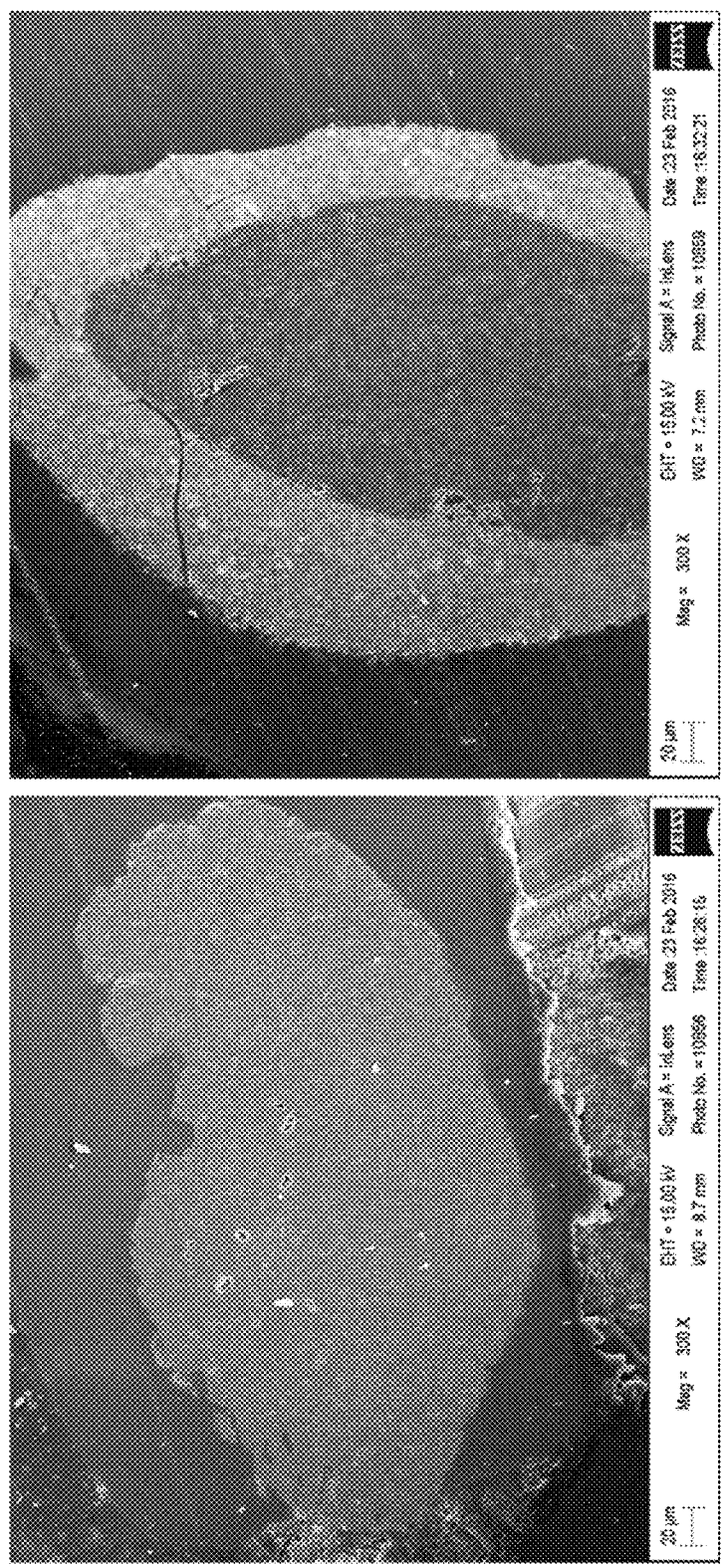
Figure 11D:
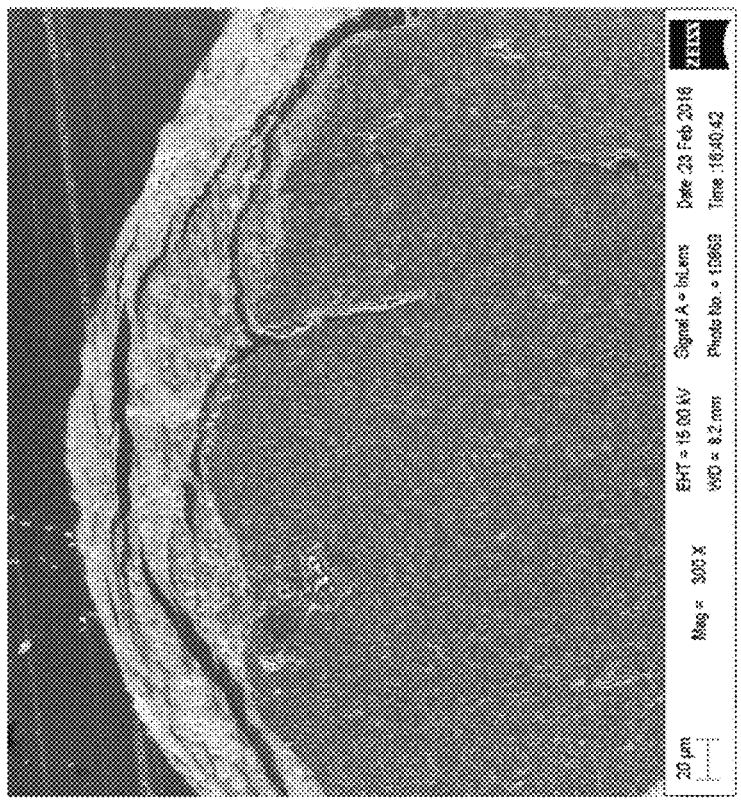
Figure 11C:
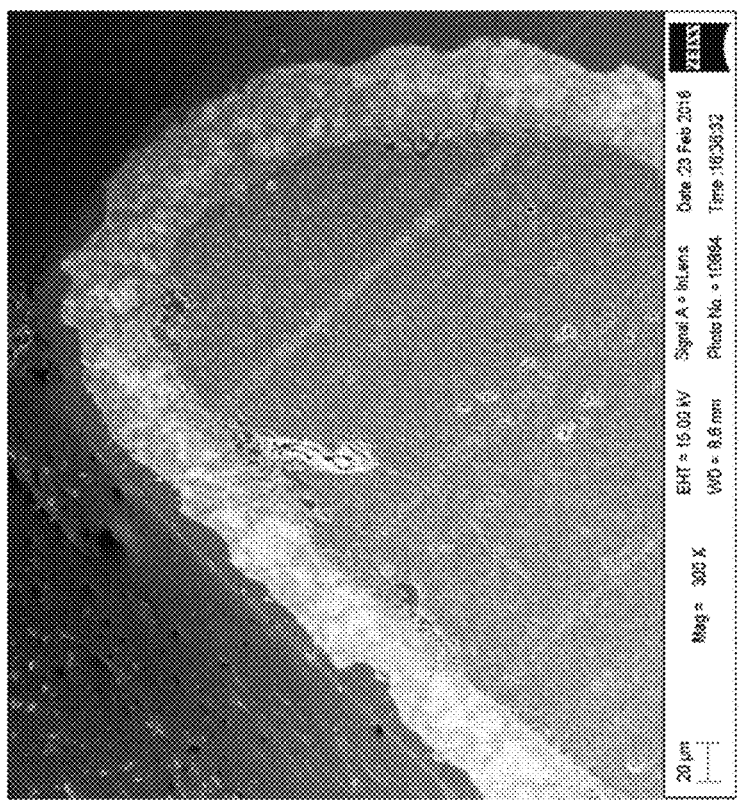

FIGS. 11A to 11D show the SEM sectional views of the conventional silica sand material before a reaction, and after 1, 3 and 5 days of reaction. FIG. 11A shows that the surfaces and inner layers of the conventional silica sand support had no pores; FIG. 11B to 11D show that 1 day, 3 days and 5 days after the reaction, the surfaces of the silica sand material support had precipitate, and no elongated crystals were found.

Figures 12A, 12B:
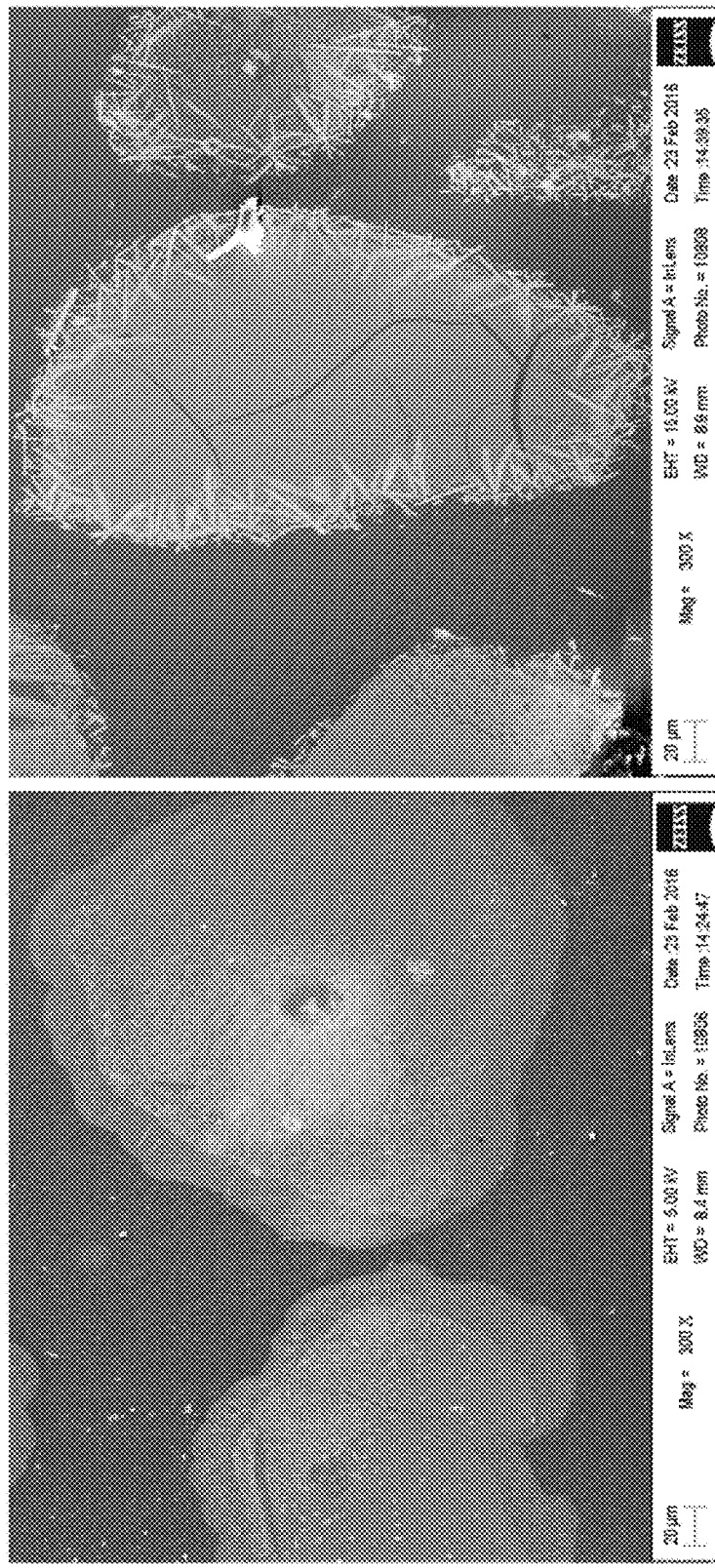
Figure 12D:
Figure 12C:
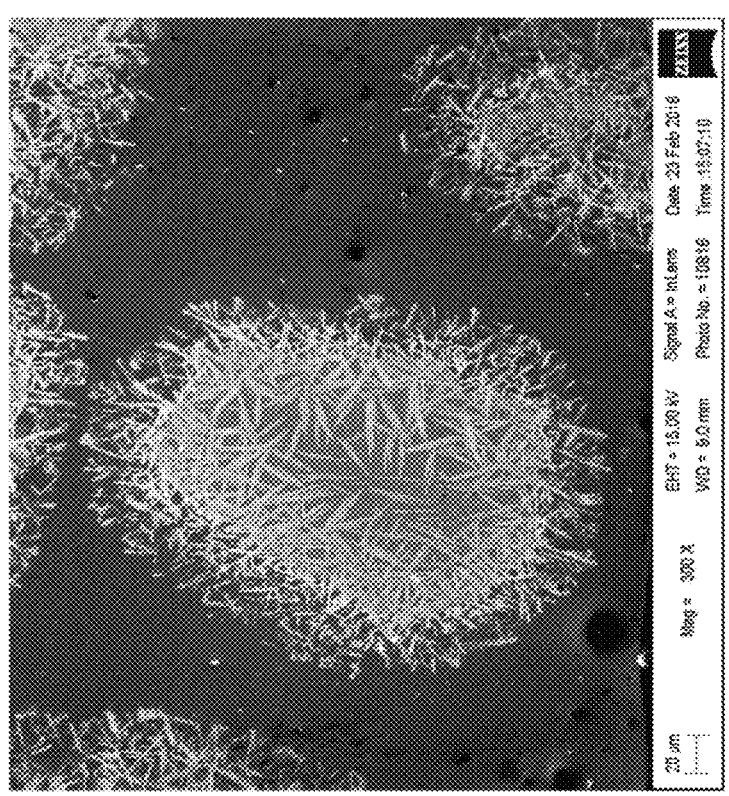

FIGS. 12A to 12D show the SEM sectional views of a MCL material support before a reaction, and after 1, 3 and 5 days of reaction. FIG. 12A shows that the surface and inner layers of the MCL material support had pores; FIG. 12B shows elongated crystals appeared on the MCL material support after 1 day of reaction; FIG. 12C shows that, after 3 days of reaction, crystals grew slowly towards the inner layers; and FIG. 12D shows that, after 5 days of reaction, the nano-sized pores of the MCL material support were already covered with a first layer of crystals, and started to grow towards the outer layers to form a second layer of crystals.

Accordingly, the SEM identification could also verify that the conventional silica sand support still had no crystals formed after 5 days of reaction, such that no crystallization rate was calculated. On the contrary, the MCL material support contained crystals grown for 5 days of reaction, and the crystals continued to grow on the surfaces of the existing crystals. As a result, the MCL material support had a high crystallization rate.

Test Example 10 Assessment on the Energy Consumption of the Refluxing Forces of a Conventional Silica Sand Support and an MCL Material Support Energy consumption required for operating a fluidized bed reactor of a 10M pump lift was estimated from the refluxing forces required for the actual operation of a conventional silica sand support and an MCL material support (i.e., the force required for controlling the rotational speed of the pump 4 in FIG. 7). As shown in Table 14, the MCL material support required electricity (energy consumption) of about 5372 KW per year, but the conventional silica sand support required electricity of about 32228 KW per year. It is clear that the refluxing force of the MCL material support in the fluidized bed reactor reduced by 83.3%, showing that it has the advantage of low energy consumption.

TABLE 14

|  | Conventional silica sand support | MCL material support |
| --- | --- | --- |
| Flowing amount (liter/min, LPM) | 133 | 22.2 |
| Pump lift (M) | 10 | 10 |
| Power (HP) | 5 | 0.83 |
| Electricity (KW) | 3.73 | 0.62 |
| Electricity per day (KW) | 90 | 15 |
| Electricity per month (KW) | 2685.6 | 447.6 |
| Electricity per year (KW) | 32227.2 | 5371.2 |

The above examples are merely for exemplification, and not intended to limit the present disclosure. A person skilled in the art can modify and alter the above examples without departing from the spirit and scope of the present disclosure. Accordingly, the scope of the present disclosure should be accorded to the appended claims of the present application.

What is claimed is:

1. An inorganic material for removing a harmful substance from wastewater, comprising:
   A plurality of porous silicate particles having a glass phase structure, wherein the porous silicate particles comprise silicon dioxide, aluminum oxide, barium oxide, cesium oxide, and boron oxide, and wherein the porous silicate particles have an average pore diameter of from 3 nm to 50 nm, a specific surface area of from 65 m$^2$/g to 500 m$^2$/g, and have a zeta potential of a negative value at pH of from 1 to 5.

2. The inorganic material of claim 1, wherein pore diameters of at least 60% pore volume of the porous silicate particles are in a range of from 3 nm to 50 nm.

3. The inorganic material of claim 1, wherein the porous silicate particles have a specific weight of from 0.5 g/cm$^3$ to 0.8 g/cm$^3$.

4. The inorganic material of claim 1, wherein the silicon dioxide and the aluminum oxide in the component of the porous silicate particles are at a weight ratio of from 2 to 5.

5. The inorganic material of claim 1, further comprising an active metal adsorbed into the glass phase structure of the porous silicate particles.

6. The inorganic material of claim 5, wherein the active metal comprises at least one of sodium, potassium, calcium, and magnesium.

7. The inorganic material of claim 5, wherein the active metal is in an amount of from 3% to 21%, based on a weight of the inorganic material.

8. The inorganic material of claim 1, wherein the inorganic material has an adsorption capability of higher than 10 mg/g for a heavy metal.

9. The inorganic material of claim 8, wherein the heavy metal comprises at least one of a transitional metal and arsenic.

10. The inorganic material of claim 1, wherein the porous silicate particles have a crystal of the harmful substance crystallized thereon.

11. The inorganic material of claim 10, wherein the crystal of the harmful substance is at least one of an arsenic crystal, a boron crystal, a phosphor crystal and a fluorine crystal.

12. A method for preparing an inorganic material for removing a harmful substance from wastewater, comprising:
    Preparing a silicate powder comprising silicon dioxide, aluminum oxide, barium oxide, cesium oxide and boron oxide; and
    Reacting the silicate powder with a metal compound at a reaction temperature of from 800° C. to 1500° C. to form a plurality of porous silicate particles having a glass phase structure, wherein the porous silicate particles have an average pore diameter of from 3 nm to 50 nm, a specific surface area of from 65 m$^2$/g to 500 m$^2$/g, and a zeta potential of a negative value at pH of from 1 to 5, and wherein the silicate powder and the metal compound are at a weight ratio of from 1:1 to 1:20.

13. The method of claim 12, wherein the silicate powder is prepared from LCD panel glass as a raw material.

14. The method of claim 12, wherein a content of the boron oxide is higher than 5%, based on a weight of the silicate powder, and the content of the boron oxide is less than 5%, based on a weight of the porous silicate particles.

15. The method of claim 12, wherein the silicon dioxide and the aluminum oxide in the component of the silicate powder are at a weight ratio of from 2 to 5.

16. The method of claim 12, wherein the metal compound is at least one selected from the group consisting of potassium carbonate, sodium carbonate, calcium carbonate and magnesium carbonate.

17. A method for treating wastewater containing a harmful substance, comprising:
    Feeding the wastewater containing a harmful substance into a fluidized bed reactor containing a support for the harmful substance in the wastewater to be crystallized on the support and removed to obtain treated water, wherein the support comprises the inorganic material of claim 1; and
    Feeding the treated wastewater out from the fluidized bed reactor.

18. The method of claim 17, wherein the porous silicate particles have a particle diameter in a range of from 0.1 mm to 0.4 mm.

\* \* \* \* \*